(12) United States Patent
Waki

(10) Patent No.: US 7,188,655 B2
(45) Date of Patent: Mar. 13, 2007

(54) PNEUMATIC TIRE

(75) Inventor: Yoshiyuki Waki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/415,949

(22) PCT Filed: Jul. 9, 2002

(86) PCT No.: PCT/JP02/06962

§ 371 (c)(1),
(2), (4) Date: May 7, 2003

(87) PCT Pub. No.: WO03/006267

PCT Pub. Date: Jan. 23, 2003

(65) Prior Publication Data

US 2004/0025997 A1 Feb. 12, 2004

(30) Foreign Application Priority Data

| Jul. 10, 2001 | (JP) | ............................. 2001-209241 |
| Sep. 5, 2001 | (JP) | ............................. 2001-268229 |
| Dec. 26, 2001 | (JP) | ............................. 2001-393069 |

(51) Int. Cl.
*B60C 5/16* (2006.01)
*B60C 15/00* (2006.01)

(52) U.S. Cl. ...................................... 152/543; 152/539

(58) Field of Classification Search ................ 152/539, 152/541–543, 546–548, 550, 552, 554, 555–556, 152/563–564
See application file for complete search history.

(56) References Cited

U.S. PATENT DOCUMENTS 3,062,259 A * 11/1962 Saint-Frison et al. ........ 152/550
3,851,692 A * 12/1974 Takemura et al. .......... 152/527
4,231,409 A * 11/1980 Mezzanotte ................. 152/527
5,048,584 A *  9/1991 Nakano et al. ............. 152/543

(Continued)

FOREIGN PATENT DOCUMENTS

FR      2 615 453 A      11/1988

(Continued)

OTHER PUBLICATIONS

MatWeb.com Online Materials Database, RTP Company RTP 291 Nylon 6/6 (PA 6/6) Carbon Fiber 60%, pp. 1-2.*

(Continued)

*Primary Examiner*—Jason R. Bellinger
(74) *Attorney, Agent, or Firm*—Sughrue Mion, PLLC

(57) ABSTRACT

A pneumatic tire including a radial carcass (5) of at least one carcass ply including a main body portion (3a) and a turnup portion (3b), and a reinforcing member (7) including at least two reinforcing layers. The at least two reinforcing layers (6a, 6b) are cross reinforcing layers (21) arranged so as to envelop at least the turnup portion of the radial carcass and cross cords of these layers with each other. Outer ends of the cross reinforcing layers, located outward from the turnup portion (3b) of the radial carcass in the widthwise direction of the tire, are outward from an outer end (13) of the turnup portion of the radial carcass in the radial direction of the tire. A crossing angle α between cords of adjacent cross reinforcing layers with respect to a circumferential direction (15) of the tire is more than 50° but less than 130°.

6 Claims, 14 Drawing Sheets

U.S. PATENT DOCUMENTS

| | | | |
|---|---|---|---|
| 5,626,698 A * | 5/1997 | Tsuruta et al. | 152/541 |
| 6,000,452 A * | 12/1999 | Sumiya et al. | 152/454 |
| 6,260,597 B1 * | 7/2001 | Miyazono | 152/543 |
| 6,279,635 B1 * | 8/2001 | Miyazono | 152/539 |
| 6,345,657 B1 * | 2/2002 | Kato | 152/540 |
| 6,701,988 B2 * | 3/2004 | Yamaguchi | 152/539 |

FOREIGN PATENT DOCUMENTS

| | | |
|---|---|---|
| JP | 60-18409 A | 1/1985 |
| JP | 60-50006 A | 3/1985 |
| JP | 61-57405 A | 3/1986 |
| JP | 61-105202 A | 5/1986 |
| JP | 11-001107 A | 1/1999 |
| JP | 2002-274127 A | 9/2002 |

OTHER PUBLICATIONS www.goodfellow.com, Polyamide- Nylon 6,6 Material Information, pp. 1-4.*

* cited by examiner

Angle $\theta_2$ of outermost ply

Crossing angle $\theta_3$ (degree)

PNEUMATIC TIRE

TECHNICAL FIELD

This invention relates to a pneumatic tire effectively improving, in particular, bead portion durability.

BACKGROUND ART

In the pneumatic radial tire running under loading, a phenomenon that a part of a sidewall portion located just above a tread contacting with a road surface is largely bent and also a part of a bead portion located outward from a rim flange of a wheel in a radial direction of the tire is largely deformed outward in a widthwise direction of the tire as shown in FIG. 21 repeatedly occurs every ground contact. By such a deformation phenomenon is applied a large shearing strain to a neighborhood of an outer end of a turnup portion of a radial carcass between the carcass and rubber located therearound in the widthwise direction of the tire and hence there is a fear of deteriorating the durability of the tire.

And also, a deformation in substantially a circumferential direction of the tire is created in the sidewall portion and the bead portion corresponding to a leading part and a trailing part in a ground contact face of the tread portion, so that the shearing strain is also applied to a position of the outer end of the turnup portion of the carcass and hence there is a fear of deteriorating the durability of the tire.

In the heavy duty pneumatic radial tire applied to a truck, a bus and the like, a recommended internal pressure applied after the assembling into a rim is set to a higher level. However, in case of applying such a higher internal pressure, compression force is applied to rubber part of the bead portion sandwiched between the turnup portion of the carcass ply in the bead portion and a flange of the rim (for example, a rubber reinforcing layer contacting with the rim) by reaction force of the internal pressure, whereby the rubber part is moved outward along the rim flange in the radial direction of the tire in proportion to the deformation quantity corresponding to the compression force. Since the carcass ply reinforced by the high rigidity cords such as steel cords or the like hardly deforms, a large shearing strain is created in an outer surface rubber constituting the carcass ply located on the turnup portion thereof, and as a result, the shearing strain applied to the outer end of the turnup portion of the carcass ply becomes further large.

As means for controlling the shearing strain created at the outer end of the turnup portion of the carcass ply, it is useful that at least one reinforcing layer is arranged so as to locate an outer end thereof outward from the outer end of the turnup portion in the radial direction of the tire to thereby transfer trouble nucleus from the outer end position of the turnup-portion to the outer end position of the reinforcing layer, which is disclosed, for example, in JP-A-11-20423 and the like.

As another means for controlling the shearing strain, it is useful to rationalize a bead filler as disclosed in JP-A-8-225005.

Even in recent heavy duty pneumatic radial tires, however, the flattening of a section profile is promoting, and an input to the bead portion in the running tends to be increased by such a flattening. In addition, the durability of the bead portion can not be sufficiently improved by the aforementioned means for controlling the shearing strain in the retreading operation (the retreading number also increases), and hence further improvement is desired.

In the construction shown in JP-A-11-20423, troubles may be still caused in the outer end position of the turnup portion of the carcass and there is a problem that the protecting action of the reinforcing layer to portions of the main trouble is not sufficient.

In low-section profile, large-size tires having an aspect ratio of not more than 60%, there is a serious problem that premature deterioration of new tire is caused by the trouble of the bead portion but also the retreading number decreases.

DISCLOSURE OF THE INVENTION

It is, therefore, an object of the invention to provide a pneumatic tire in which the shearing strains produced in the widthwise direction and circumferential direction of the tire during the running under loading are sufficiently decreased at the outer end position of the turnup portion of the carcass located in the bead portion even in the recent flattening of the radial tire and the repetitive retreading of the tire by properly arranging cross reinforcing layers to improve the durability of the bead portion.

It is another object of the invention to provide a pneumatic tire in which the durability of the bead portion is effectively improved by utilizing an outermost ply located in the turnup portion of the carcass while controlling the increase of the weight resulted from the arrangement of the reinforcing member.

In order to achieve the above objects, the pneumatic tire according to a first aspect of the invention comprises a radial carcass of at least one carcass ply comprised of a main body portion toroidally extending between bead cores respectively embedded in a pair of bead portions and a turnup portion extending from the body portion and wound around the bead core and a bead filler located just above the bead core, said bead filler being comprised of a lower rubber portion arranged adjacent to an outer circumferential surface of the bead core and an upper rubber portion arranged adjacent to the lower rubber portion and outward therefrom in a radial direction of the tire and having a rigidity lower than that of the lower rubber portion, characterized in that the tire comprises a reinforcing member consisting of at least two rubberized reinforcing layers each containing steel cords or organic fiber cords arranged in parallel to each other, and at least two reinforcing layers among these reinforcing layers constituting the reinforcing member are cross reinforcing layers arranged so as to envelop at least the turnup portion of the radial carcass and cross the cords of these layers with each other, and both outer ends of the reinforcing layers constituting the cross reinforcing layers located outward from the turnup portion of the radial carcass in a widthwise direction of the tire are located outward from an outer end of the turnup portion of the radial carcass in the radial direction of the tire, and the steel cord or the organic fiber cord constituting each of the reinforcing layers is formed by twisting filaments each having a modulus of elasticity of not less than 40 GPa, and a bending rigidity per one steel cord or one organic fiber cord is not more than 2 GPa·mm$^4$, and the product of the bending rigidity (GPa·mm$^4$) per one cord and an end count (cords/mm) in the steel cords or the organic fiber cords is 0.012–0.62 (GPa·mm$^4$·cord/mm), and a crossing angle ($\alpha$) between the cords of the adjacent reinforcing layers with respect to a circumferential direction of the tire is more than 50° but less than 130°.

Moreover, the term "modulus of elasticity in the filament" used herein means a modulus of elasticity obtained by stretching a single untwisted filament.

In general, when an internal pressure is filled in the pneumatic radial tire assembled into the rim, the compression force is applied to the rubber portion sandwiched between the outer end of the turnup portion of the radial carcass and the rim flange by the internal pressure and the reaction force thereof, and as a result, the rubber portion moves outward from a top portion of the rim flange in the radial direction of the tire and then moves outward in the widthwise direction of the tire.

On the contrary, the radial carcass reinforced by the cords hardly deforms even if it is subjected to the reaction force based on the internal pressure, so that the shearing strain in the widthwise direction of the tire is created between the outer end of the turnup portion of the radial carcass and the above rubber portion.

The shearing strain in the widthwise direction of the tire becomes larger especially during the running of the tire under loading. According to the first aspect of the invention, there is disposed the reinforcing member consisting of at least two rubberized reinforcing layers each containing high-rigidity steel cords or organic fiber cords formed by twisting filaments each having a modulus of elasticity of not less than 40 GPa and arranged in parallel to each other, in which at least two reinforcing layers among these reinforcing layers constituting the reinforcing member are cross reinforcing layers arranged so as to envelop at least the turnup portion of the radial carcass and cross the cords of these layers with each other, and both outer ends of the reinforcing layers constituting the cross reinforcing layers located outward from the turnup portion of the radial carcass in the widthwise direction of the tire are located outward from the outer end of the turnup portion of the radial carcass in the radial direction of the tire, so that the above compression force can be absorbed by rubber located widthwisely outward from the reinforcing layer, which is located outward from the outer end of the turnup portion of the radial carcass in the widthwise direction of the tire, so as not to affect such a compression force to the outer end of the turnup portion of the radial carcass and rubber located therearound. As a result, the occurrence of the shearing strain in the widthwise direction of the tire can be prevented between the outer end of the turnup portion of the radial carcass and the rubber located outward therefrom in the widthwise direction of the tire, and hence there can be realized the durability of the bead portion capable of bearing the recent flattening of the tire and the repetitive retreading of the tire.

Also, in the pneumatic radial tire according to the invention, by arranging at least two reinforcing layers each containing high-rigidity cords as mentioned above can be controlled the deformation of the tire constitutional member such as carcass ply or the like in the circumferential direction of the tire, which has hitherto been observed in a zone ranging from the bead portion to the sidewall portion located corresponding to the ground contact face, particularly each of the leading part and the trailing part during the running under loading, whereby the shearing strain in the circumferential direction of the tire can be controlled in the vicinity of the turnup portion of the radial carcass and hence there can be realized the durability of the bead portion capable of bearing the recent flattening of the tire and the repetitive retreading of the tire.

Moreover, the first aspect of the invention is accomplished in the light of a point that when two reinforcing layers each containing organic fiber cords usually used therein are piled one upon the other so as to cross the cords of the reinforcing layers with each other, the shearing strain in the circumferential direction of the tire is substantially halved as compared with the conventional case not arranging the reinforcing layer. In order to develop this effect, it is necessary that the modulus of elasticity of the filament constituting the cords of the reinforcing layer is made not less than 40 GPa·mm$^4$, and also it is necessary that the crossing angle α between the cords of the adjacent reinforcing layers with respect to the circumferential direction of the tire is made more than 50° but less than 130°.

In the first aspect of the invention, the steel cord or the organic fiber cord constituting each reinforcing layer is formed by twisting the filaments and the bending rigidity per the steel cord or the organic fiber cord is made not more than 2 GPa, whereby the reinforcing layer easily follows to the deformation of the rubber located outward therefrom in the widthwise direction of the tire, and hence the shearing strains in both the widthwise direction and the circumferential direction of the tire created between the reinforcing layer and the rubber located outward therefrom in the widthwise direction of the tire can be controlled to prevent separation failure between the outer end of the reinforcing layer and the rubber located therearound to thereby realize an excellent rigidity in the bead portion of the tire.

And also, the first aspect of the invention is accomplished in the light of a point that in order to sufficiently develop the above effect, it is necessary to render the product of the bending rigidity (GPa·mm$^4$) per the cord and an end count (cords/mm) in the steel cords or the organic fiber cords into 0.012–0.62 (GPa·mm$^4$cords/mm) in addition to the above bending rigidity per the cord.

In the first aspect of the invention, it is preferable that one reinforcing layer among the reinforcing layers constituting the reinforcing member is a wide reinforcing layer arranged so as to envelop a zone of the radial carcass ranging from the turnup portion to the main body portion and an inner end of the wide reinforcing layer located inward from the main body portion of the radial carcass in the widthwise direction of the tire is located outward from an outermost end of the lower rubber portion constituting the bead filler in the radial direction of the tire.

As the conventional embodiment of arranging the reinforcing layer, it is general to combine two reinforcing layers, i.e. a reinforcing layer arranged so as to cover the outer end of the turnup portion of the radial carcass and a reinforcing layer arranged over a region ranging from the inner side of the main body portion of the radial carcass in the widthwise direction of the tire to the vicinity of the outer end of the turnup portion of the radial carcass. However, the use of the wide reinforcing layer can develop the same effect as in the above combination of the two reinforcing layers and can realize the simplification of the tire construction, the weight reduction and the reduction of the production cost, respectively.

Moreover, the wide reinforcing layer may be constituted with two or more split reinforcing layer sections separated along the circumferential direction of the tire. In this case, the rigidities of the mutual split reinforcing layer sections can be differed by properly changing the arranging angle of the cord and the like in the plural split reinforcing layer sections according to the purpose. However, since there is fear that separation failure between the split reinforcing layer section and rubber located therearound is prematurely caused at the separating position due to a step difference in the rigidity created at the separating position, it is preferable that such a separation failure is prevented by placing the separating position into a range inward from the outer end of the turnup portion of the radial carcass in the radial direction of the tire at the outer side of the turnup portion of the radial carcass in the widthwise direction of the tire.

Moreover, if the separating position is within the above range, it may be either inside the main body portion of the radial carcass in the widthwise direction of the tire or outside the turnup portion of the radial carcass in the widthwise direction of the tire, or may be arranged at plural positions.

In the first aspect of the invention, it is further preferable that a protection layer of rubberized cords each formed by twisting filaments having a modulus of elasticity of less than 40 GPa is arranged between the reinforcing member and the carcass and/or so as to at least envelop the outer ends of the cross reinforcing layers located outside the turnup portion of the radial carcass in the widthwise direction of the tire.

In this case, the separation failure between the end portion of the reinforcing layer and the rubber located therearound can be controlled to further enhance the rigidity of the bead portion in the tire.

In the first aspect of the invention, it is preferable to arrange a cushion rubber layer outside the turnup portion of the radial carcass in the widthwise direction of the tire.

Moreover, in order to arrange the cushion rubber layer, the arranging shape of the turnup portion of the radial carcass may be substantially a straight shape or a bended or curved shape viewing at a cross section in the widthwise direction of the tire.

When the reinforcing layer is arranged outside the turnup portion of the radial carcass in the widthwise direction of the tire, it tends that cracks generated in the radial carcass easily arrive at the reinforcing layer. In the pneumatic radial tire according to the invention, however, the cushion rubber layer is arranged outside the turnup portion of the radial carcass, whereby the propagation of the crack to the reinforcing layer can be prevented to further improve the durability of the bead portion in the tire.

Also, such a cushion rubber layer not only prevents the propagation of the crack but also mitigates the compression force applied by the internal pressure and the reaction force thereof to the rubber portion sandwiched between the outer end of the turnup portion of the radial carcass and the rim flange to control the shearing strain in the widthwise direction of the tire between the outer end of the turnup portion of the radial carcass and the rubber portion, whereby the durability of the bead portion in the tire can be more further improved.

Moreover, the cushion rubber layer is desirable to have a hardness lower than that of rubber coating the cords constituting the radial carcass for the above mitigation of the compression force, and is preferable to be made of the same rubber material as the sidewall rubber or the bead filler for preventing the increase of the kind of rubbers used in view of the production economy.

Furthermore, in case of attaching importance to the weight reduction in the first aspect of the invention, it is preferable that the reinforcing layers are arranged only at the side of the turnup portion of the carcass.

The pneumatic tire according to a second aspect of the invention is a pneumatic tire including a carcass of at least one rubberized ply containing high-rigidity cords therein and having a main body portion toroidally extending between bead cores respectively embedded in a pair of bead portions and a turnup portion extending from the main body portion and wound around the bead core and, in which the high-rigidity cords located in the main body portion are arranged side by side in substantially a radial direction, and a reinforcing member arranged at least along an outer surface of the turnup portion and comprised of at least one rubberized reinforcing layer containing high-rigidity cords therein, characterized in that an outermost ply located on at least an outermost side in a widthwise direction of the tire among the plies constituting the turnup portions has at least one bending portion changing an extending direction of the cord along an innermost reinforcing layer located adjacent to the outermost ply among the reinforcing layers, and a cross cord portion is formed by an upper portion of the outermost ply located outward from a position of the bending portion in the radial direction of the tire and the innermost reinforcing layer, and a crossing angle of cords constituting the cross cord portion with respect to a circumferential direction of the tire is not less than 50°.

In the second aspect of the invention, it is preferable that an extending angle of the cord in the innermost reinforcing layer with respect to the circumferential direction of the tire is a range of 20–55° and an extending angle of the cord in the upper portion of the outermost ply with respect to the circumferential direction of the tire is a range of 30–55°.

In the second aspect of the invention, it is further preferable that the bending portion is located in a range of 0.01–0.5 times a distance from a position of a height of a rim flange to a position of an outer end of the outermost ply as measured in the radial direction of the tire in a state of mounting the tire onto a standard rim and applying a maximum air pressure thereto.

In the second aspect of the invention, it is also preferable that a length of the cross cord portion in the radial direction of the tire is not less than 20 mm.

In the second aspect of the invention, it is preferable that the high-rigidity cord constituting at least the outermost ply and the innermost reinforcing layer is a steel cord or an aramid cord. Particularly, it is preferable that a modulus of elasticity of all filaments constituting the high-rigidity cord at least used in the outermost ply and the innermost reinforcing layer is not less than 40 GPa.

In the second aspect of the invention, it is also preferable that the reinforcing layer is arranged only at a side of the turnup portion of the carcass.

In the second aspect of the invention, it is further preferable that a pair of cushion rubber layers sandwiching both the outer ends of the outermost ply and the innermost reinforcing layer from both an inside and an outside in the widthwise direction of the tire are arranged over a region including these outer ends in the radial direction of the tire, and a rubber hardness in the cushion rubber layers is within a range of 0.95–1.05 of a hardness in rubber constituting a member having an outer end located more outward in the radial direction of the tire in the outermost ply and the innermost reinforcing layer.

In addition, it is preferable that when a normal line passing through a position of the outer end of the cross cord portion in the radial direction of the tire and drawn to an outer surface of the tire is n1 and a normal line passing through a position of an outermost end located more outward in the radial direction of the tire in the outer end position of the outermost ply and the outer end position of the innermost reinforcing layer and drawn to an outer surface of the tire is n2 viewing at a cross section in the widthwise direction of the tire, a distance from a cord center position of the main body portion of the carcass ply to a position of the outer end of the cross cord portion in the radial direction of the tire as measured on the normal line n1 is a range of 0.4–0.7 times a distance to the outer surface of the tire in the same manner as mentioned above, and a distance from the cord center position of the main body portion of the carcass ply to the position of the outermost end as measured on the normal line n2 is a range of 0.7–0.9 times a distance to the outer surface of the tire in the same manner as mentioned above.

EXEMPLARY EMBODIMENTS OF THE INVENTION

Various embodiments of the invention will be described with reference to the accompanying drawings below.

Figure 1:
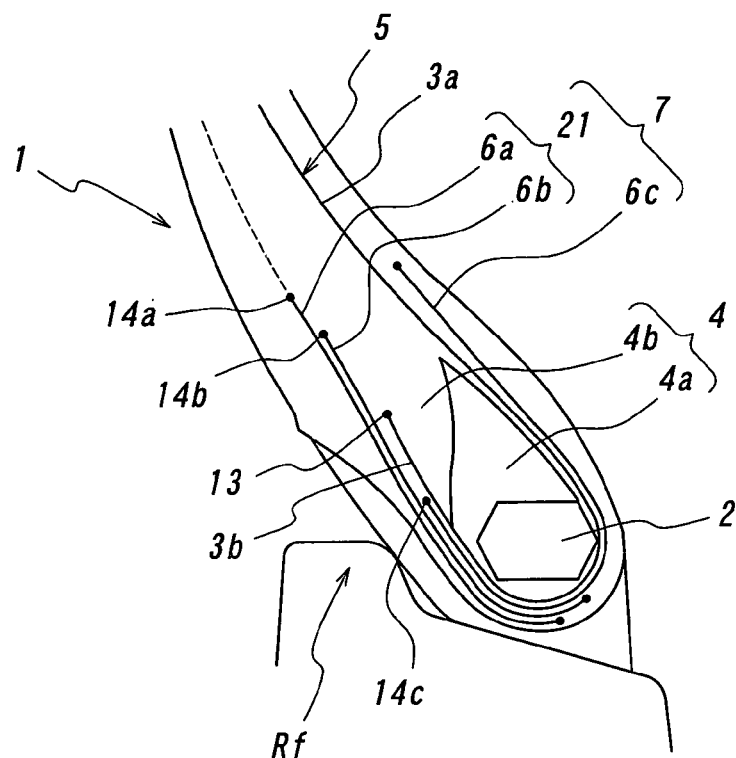
FIG. 1 is a widthwise section view of a bead portion in the pneumatic radial tire according to the first aspect of the invention.

In FIG. 1 is shown a widthwise section of a main part including a bead portion in the pneumatic tire according to the first aspect of the invention at a state of mounting onto a rim, in which numeral 1 is a bead portion, numeral 2 a bead core, numeral 4 a bead filler, numeral 5 a radial carcass, numerals 6a–6c reinforcing layers, and numeral 7 a reinforcing member.

The tire having the bead portion 1 shown in FIG. 1 comprises a radial carcass 5 of at least one carcass ply, one carcass ply in FIG. 1, comprised of a main body portion 3a toroidally extending between a pair of bead cores 2 embedded in respective bead portions 1 (only one side is shown in FIG. 1) and a turnup portion 3b extending from the main body portion 3a and wound around the bead core 2 and the bead filler 4 located just thereabove.

And also, the bead filler 4 is comprised of a lower rubber portion 4a arranged adjacent to an outer circumferential face of the bead core 2 and made of a relatively hard rubber and an upper rubber portion 4b arranged adjacent to an outside of the lower rubber portion 4a in the radial direction of the tire and made of a rubber softer than the lower rubber portion 4a.

A main feature of the construction according to the first aspect of the invention lies in a point of properly arranging cross reinforcing layers. More concretely, the tire comprises the reinforcing member 7 consisting of at least two rubberized reinforcing layers containing steel cords or organic fiber cords arranged in parallel to each other, three reinforcing layers 6a, 6b, 6c in FIG. 1, in which at least two reinforcing layers among the reinforcing layers 6a, 6b, 6c constituting the reinforcing member 7, two reinforcing layers 6a, 6b in FIG. 1 are cross reinforcing layers 21 arranged so as to envelop at least the turnup portion 3b of the radial carcass 5 and cross cords of these layers with each other, and outer ends 14a, 14b of the reinforcing layers 6a, 6b constituting the cross reinforcing layers 21 located outward from the turnup portion 3b of the radial carcass 5 in the widthwise direction of the tire are located outward from an outer end 13 of the turnup portion 3b of the radial carcass 5 in the radial direction of the tire, and the steel cord or the organic fiber cord constituting each of the reinforcing layers 6a, 6b, 6c is formed by twisting filaments each having a modulus of elasticity of not less than 40 GPa, and a bending rigidity per one steel cord or one organic fiber cord is not more than 2 GPa·mm$^4$, and the product of the bending rigidity (GPa·mm$^4$) per one cord and an end count (cords/mm) in the steel cords or the organic fiber cords is 0.012–0.62

(GPa·mm$^4$cords/mm), and a crossing angle α between the cords of the adjacent reinforcing layers 6a and 6b with respect to a circumferential direction 15 of the tire is more than 50° but less than 130°0.

Figure 2:
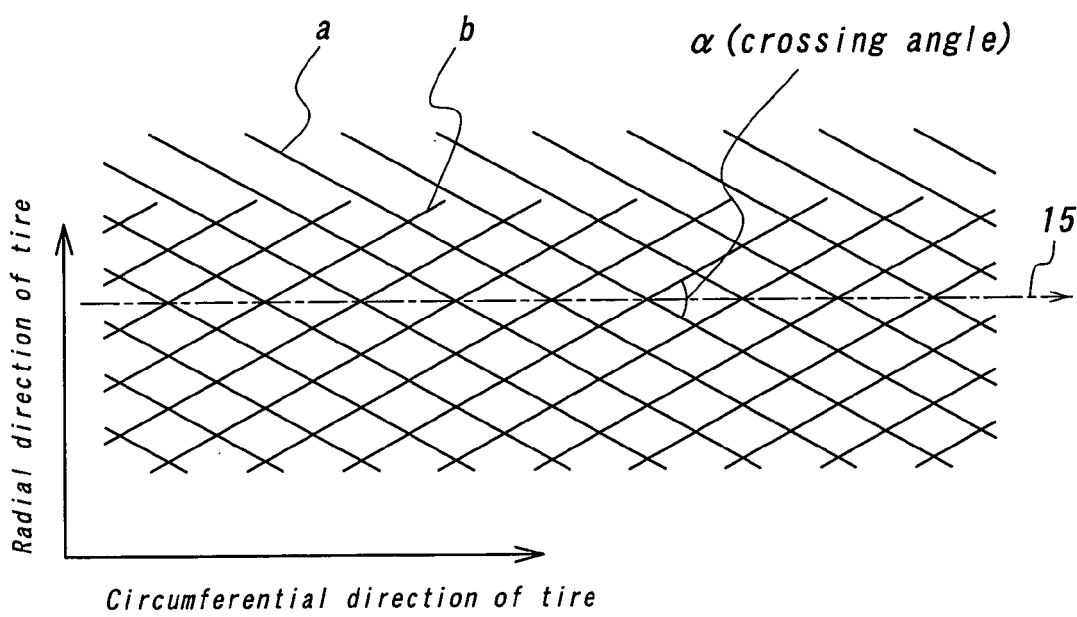
FIG. 2 is a diagrammatic view showing an embodiment of crossing cords between adjoining reinforcing layers.

The term "crossing angle α between the cords of the adjacent reinforcing layers with respect to the circumferential direction 15 of the tire" used herein means α shown in FIG. 2, and symbols a and b shown in FIG. 2 means cords of the adjacent reinforcing layers 6a, 6b.

According to the pneumatic radial tire shown in FIG. 1, shearing strains in both the widthwise direction and the circumferential direction of the tire in the bead portion generated during the running under loading are sufficiently reduced to a sufficiently durable level even in the recent flattening of the radial tire and the repetitive retreading of the tire, and hence the excellent durability of the bead portion in the tire can be realized.

In the embodiment shown in FIG. 1, a rubberized reinforcing layer 6c containing cords each formed by twisting filaments each having a modulus of elasticity of not less than 40 GPa is arranged between the reinforcing layer 6b and the radial carcass 5 over a region extending to an inside of the main body portion 3a of the radial carcass 5 in the widthwise direction of the tire, whereby the deformation in the circumferential direction at the main body portion 3a of the radial carcass 2 generated under loading can effectively be controlled to finally control separation failure between each end of the reinforcing layers 6a, 6b and rubber located therearound and to more enhance the rigidity of the bead portion in the tire.

In case of requiring to balancedly satisfy the durability of the bead portion and the weight reduction, it is preferable to arrange the reinforcing layers only at the side of the turnup portion of the carcass.

Figure 3:
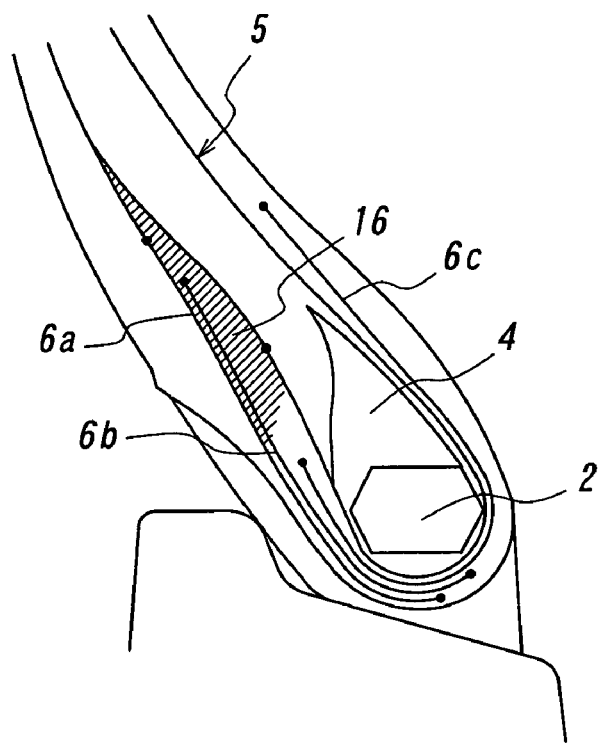
FIG. 3 is a widthwise section view of a bead portion in the pneumatic radial tire according to the first aspect of the invention.

FIG. 3 shows another embodiment of the first aspect of the invention. In this embodiment, a cushion rubber layer 16 (a hatched part of FIG. 3) is arranged outside the turnup portion 3b of the radial carcass 5 in the widthwise direction of the tire in addition to the construction shown in FIG. 1, whereby the propagation of cracks generated at the radial carcass 5 to the reinforcing layers 6a, 6b can be prevented to more further improve the durability of the bead portion in the tire.

Figure 4:
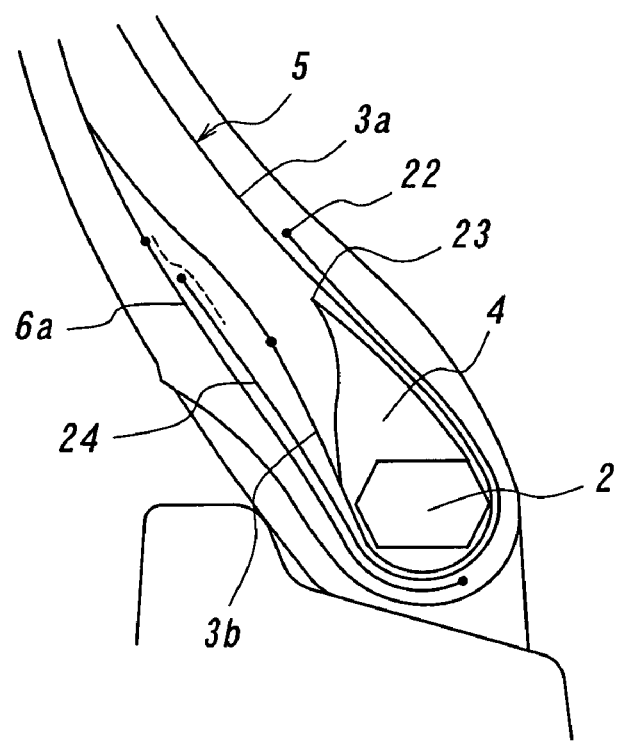
FIG. 4 is a widthwise section view of a bead portion in the pneumatic radial tire according to the first aspect of the invention.

FIG. 4 shows the other embodiment of the first aspect of the invention. In this embodiment, one wide reinforcing layer 24 is used instead of the reinforcing layer 6b and the reinforcing layer 6c shown in FIG. 1 on the assumption of the construction of FIG. 1. This wide reinforcing layer 24 is arranged so that its inner end 22 located inside the main body portion 3a of the radial carcass 5 in the widthwise direction of the tire is located outward from than an outermost end 23 of the lower rubber portion 4a constituting the bead filler 4 in the radial direction of the tire, whereby the simplification of the tire construction, the weight reduction and the reduction of the production cost can be realized, respectively.

Figure 5:
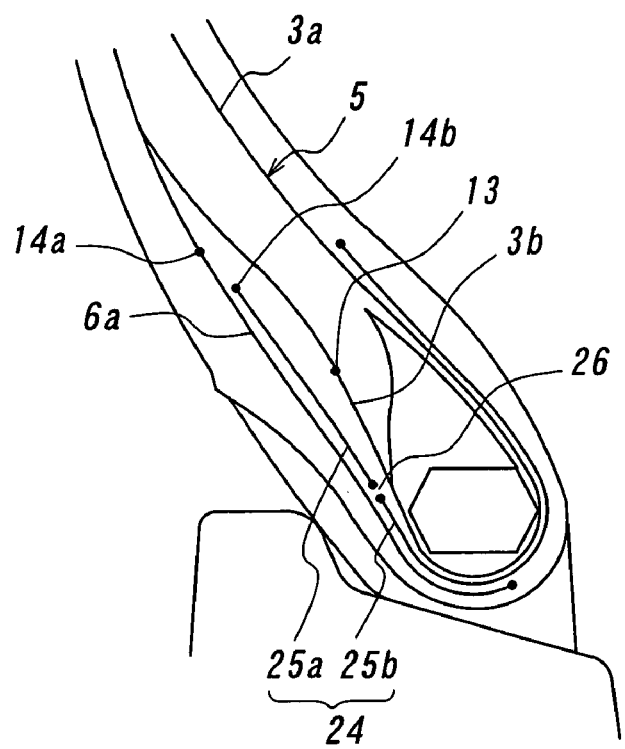
FIG. 5 is a widthwise section view of a bead portion in the pneumatic radial tire according to the first aspect of the invention.

FIG. 5 shows a further embodiment of the first aspect of the invention. In this embodiment, the wide reinforcing layer 24 is separated at the outside of the turnup portion 3b of the radial carcass 5 in the widthwise direction of the tire into two split reinforcing layer sections 25a, 25b on the assumption of the construction shown in FIG. 4. In this case, the rigidities of the split reinforcing layer sections 25a, 25b can be mutually differed according to purposes by properly changing the cord arranging angles or the like between the split reinforcing layer sections 25a, 25b.

Moreover, as there is fear that separation failure between the split reinforcing layer section 25a, 25b and the rubber located therearound at a separating position 26 is prematurely caused due to the step difference in the rigidity created at the separating position 26, it is preferable that the separating position 26 of the reinforcing layer 24 located outside the turnup portion of the radial carcass 5 in the widthwise direction of the tire is within a range located inward from the outer end 13 of the turnup portion 3b of the radial carcass 5 in the radial direction of the tire to prevent the above separation failure. Also, when the separating position 26 is within the above range, it may be arranged either inside the main body portion 3a of the radial carcass 5 in the widthwise direction of the tire or outside the turnup portion 3b of the radial carcass 5 in the widthwise direction of the tire or may be arranged at plural places.

Figure 6:
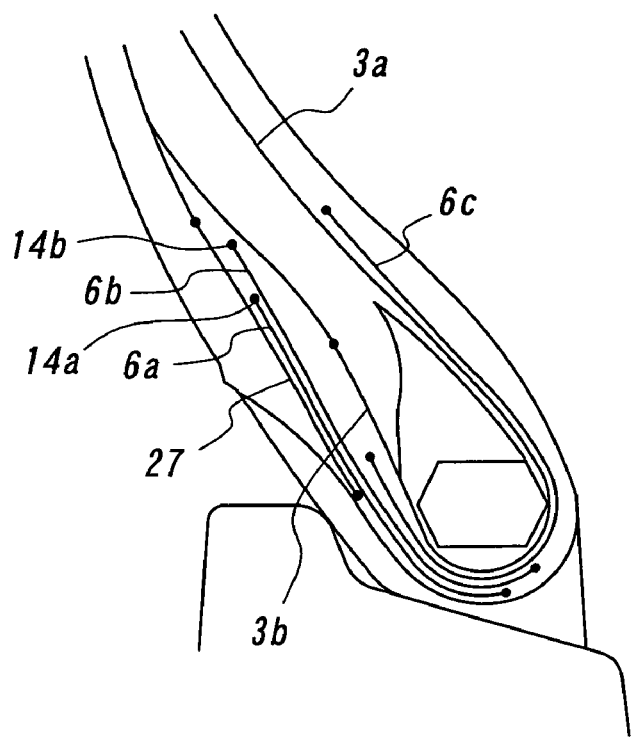
FIG. 6 is a widthwise section view of a bead portion in the pneumatic radial tire according to the first aspect of the invention.

FIG. 6 shows a still further embodiment of the first aspect of the invention. In this embodiment, on the assumption of the construction shown in FIG. 1, a relationship between positions of outer ends 14a, 14b of the reinforcing layers 6a, 6b in the radial direction of the tire is set to be opposite to that of the embodiment shown in FIG. 1, while a protection layer 27 containing low-rigidity rubberized cords therein (a modulus of elasticity of a filament is less than 40 GPa) is arranged outside the reinforcing layers 6a, 6b in the widthwise direction of the tire, whereby shearing strain generated in the vicinity of the outer ends 14a, 14b of the reinforcing layers 6a, 6b can effectively be controlled.

Moreover, when the protection layer 27 is extended upward beyond the positions of the outer ends 14a, 14b of the reinforcing layers 5, 6 in the radial direction of the tire in at least one of the outside and the inside of each of the reinforcing layers 6a, 6b in the widthwise direction of the tire, the excellent durability of the bead portion in the tire is obtained.

Figure 11:
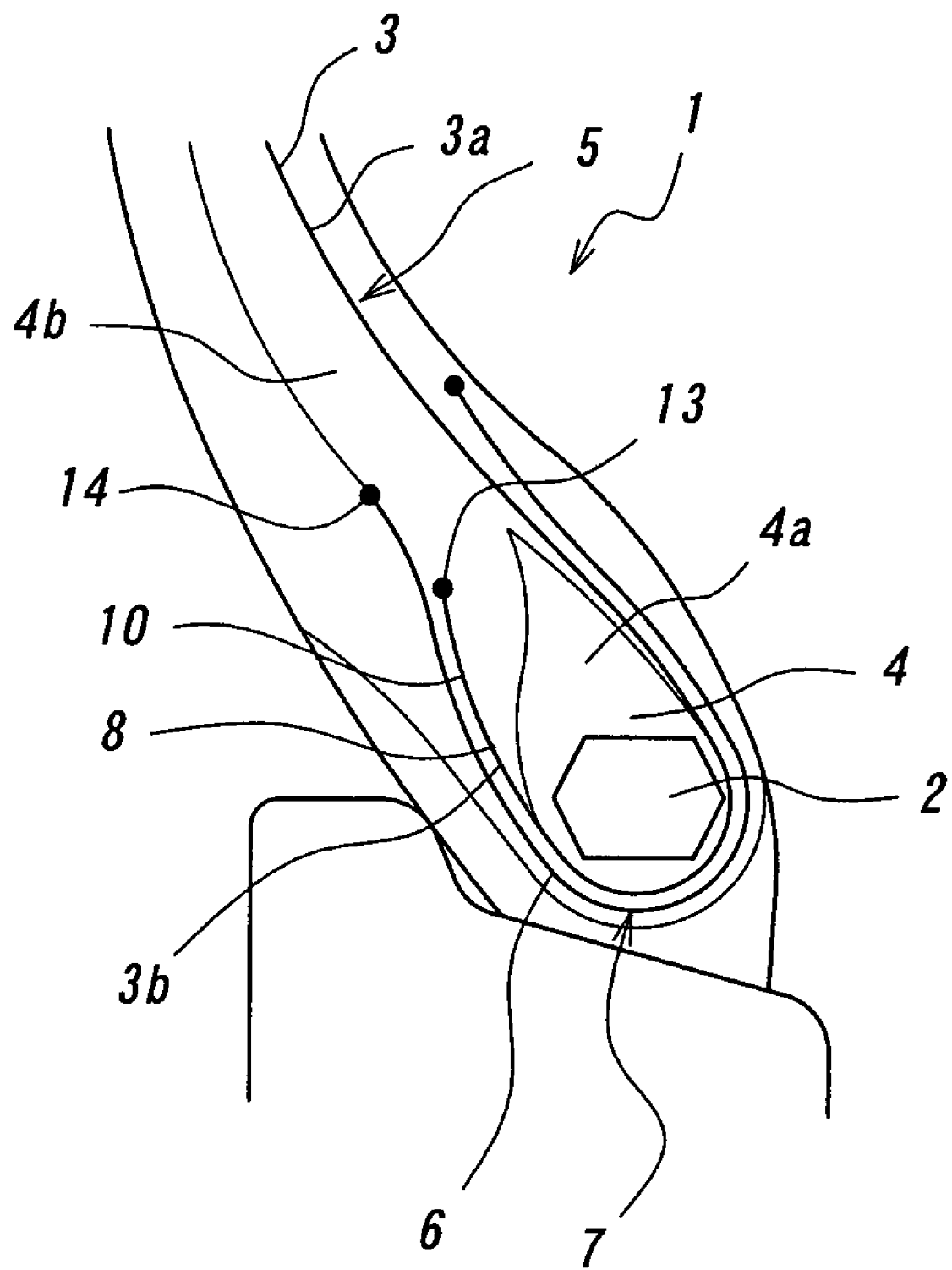
FIG. 11 is a widthwise section view of a bead portion in the pneumatic radial tire according to the second aspect of the invention.

In FIG. 11 is shown a widthwise section of a main part including a bead portion in the pneumatic tire according to the second aspect of the invention at a state of mounting onto a rim.

The tire having a bead portion 1 shown in FIG. 11 comprises a radial carcass 5 comprised of a main body portion 3a toroidally extending between a pair of bead cores 2 embedded in respective bead portions (FIG. 11 shows only one bead portion 1) and a turnup portion 3b extending from the main body portion 3a and wound around the bead core 2 and a bead filler 4 located just thereabove and consisting of a rubberized carcass ply 3 containing high-rigidity cords therein (concretely, the high-rigidity cords are arranged at an angle of 70–90° with respect to an equatorial plane of the tire). Moreover, although FIG. 11 shows a case that the carcass 5 is comprised of one ply 3, the number of plies may be increased, if necessary.

In FIG. 11 is shown a case that the bead filler 4 is comprised of two rubbers, i.e. a lower rubber portion 4a made of a hard rubber and an upper rubber portion 4b made of a soft rubber, but the construction of the bead filler according to the invention is not limited thereto and may be composed of a single rubber or three or more rubbers.

In the bead portion 1 of the tire is further arranged a reinforcing member 7 consisting of at least one rubberized reinforcing layer containing high-rigidity cords therein, one reinforcing layer 6 in FIG. 11 along at least an outer surface of the turnup portion 3b of the carcass 5.

Furthermore, the tire comprises a belt of plural cord layers each containing rubberized steel cords and a tread portion reinforced by the belt at the outer circumferential side of a crown portion of the carcass 5, and the tread portion is properly provided with tread grooves such as plural circumferential grooves extending along the circumferential direction of the tire and/or plural lateral grooves extending in a direction crossing over the circumferential grooves, plural sipes and the like in accordance with the use purpose though the illustration of these members is omitted.

A main feature of the construction in the second aspect of the invention lies in a point of properly arranging an outermost ply which is a ply 3 located at least outermost side in the widthwise direction of the tire among plies constituting the turnup portions 3b of the carcass 5 (in case of FIG. 11, as the number of plies is one, the ply 3 corresponds to the outermost ply) and an innermost reinforcing layer among the reinforcing layers 6 located adjacent thereto (in case of FIG. 11, as the number of reinforcing layers is one, the reinforcing layer 6 corresponds to the innermost reinforcing layer). More concretely, the outermost ply 3 has at least one bending portion 8 changing an extending direction of the cord at a state arranged along the innermost reinforcing layer 6, and a cross cord portion 11 is formed by an upper portion 10 of the outermost ply 3 located outward from a position of the bending portion 8 in the radial direction of the tire and the innermost reinforcing layer 6, and a crossing angle θ3 of cords 9, 12 constituting the cross cord portion 11 is not less than 50°.

By adopting the above construction can effectively be improved the durability of the bead portion while controlling the increase of the weight accompanied with the excess arrangement of the reinforcing member 7.

The development accomplishing the second aspect of the invention will be explained together with actions thereof.

In the tire according to the first aspect of the invention, the bead portion of the tire is constructed with the cross reinforcing layers 21 formed by arranging plural reinforcing layers so as to cover the outer end position of the turnup portion of the carcass and cross cords of these layers at a given angle with each other, so that the cross reinforcing layers 21 absorb the compression deformation generated at the outer side in the widthwise direction of the tire and do not propagate the compression deformation to the outer end position 13 of the turnup portion 3b, whereby the shearing strain generated at the outer end position 13 of the turnup portion 3b can be largely decreased. However, as the construction of the bead portion premises the arrangement of plural wire reinforcing layers, it is not preferable in case of attaching importance to the control of the increase of the weight or the like.

To this end, the inventors have made studies to improve the durability of the bead portion while controlling the increase of the weight accompanied with the arrangement of the reinforcing member 7.

As a result, when the ply 3 constituting the turnup portion 3b is a radial carcass, cords 9 in the ply portion of the turnup portion 3b are arranged in the radial direction likewise those in the ply portion of the main body portion 3a of the carcass 5. The inventors have found that at least one bending portion 8 changing the extending direction of the cord 9 is formed on an outermost ply 3 in the turnup portion 3b along the innermost reinforcing layer 6 and the extending direction of the cord 9 located on an upper portion 10 ranging from the bending portion 8 to the outer end 13 is inclined by a given angle from the radial direction, whereby the shearing strain generated at the outer end 13 of the turnup portion 3b of the carcass ply 3 can be controlled.

Figure 12A:
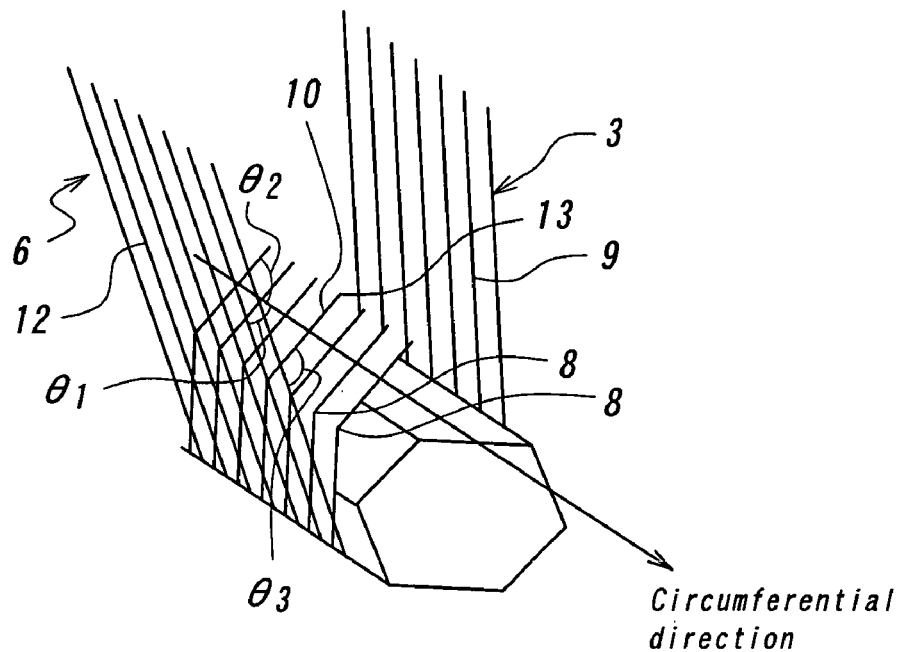
FIG. 12a is a perspective view illustrating the extending directions of the cord in the upper portion of the outermost ply and the cord in the innermost reinforcing layer.
Figure 12B:
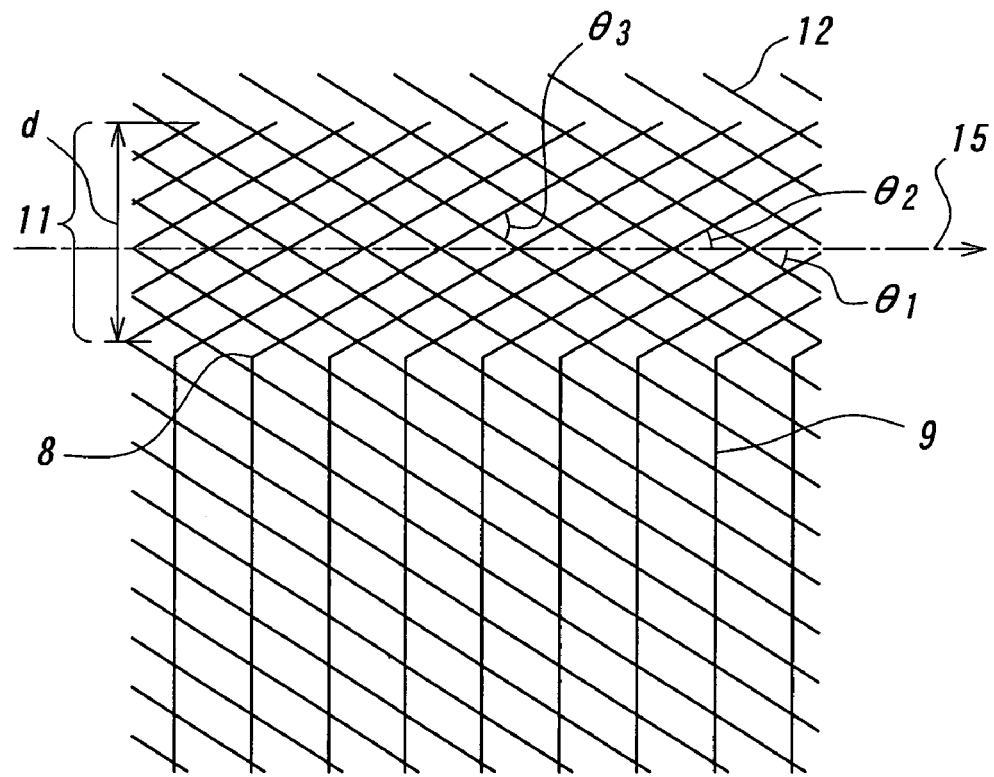
FIG. 12b is a plan view illustrating the extending directions of the cord in the upper portion of the outermost ply and the cord in the innermost reinforcing layer.

And also, when an upper portion 11 of the outermost ply 3 is utilized to form a cross cord portion 11 having a crossing angle θ3 of not less than 50° between the cords of the upper portion 11 and the innermost reinforcing layer 6 with respect to the circumferential direction of the tire as shown in FIGS. 12a and 12b, it has been found that the same durability of the bead portion as in the tire according to the first aspect of the invention supposing the arrangement of the plural reinforcing layers (concretely wire reinforcing layers) is obtained and also the weight reduction is attained, and as a result, the second aspect of the invention has been accomplished.

Moreover, the reason why the crossing angle of the cords is limited to not less than 50° is due to the fact that when it is less than 50°, the deformation in substantially the circumferential direction generated under loading can not effectively be decreased and the deterioration of the durability of the bead portion is caused.

Figure 14:
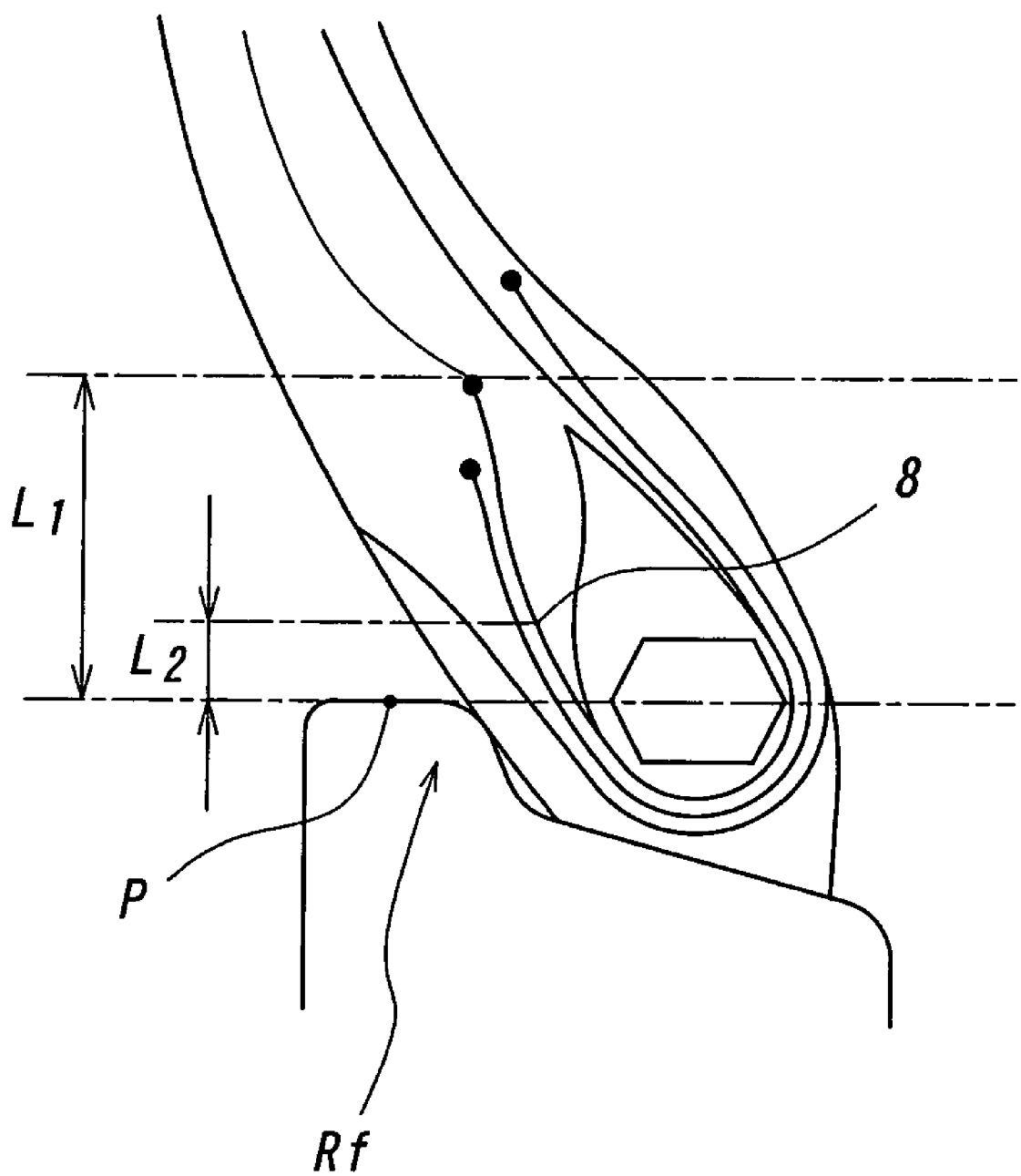
FIG. 14 is a widthwise section view of another embodiment of the bead portion.

In the second aspect of the invention, the position relationship between the outer end 13 of the outermost ply 3 and the outer end 14 of the innermost reinforcing layer 6 in the radial direction of the tire is not especially limited. The outer end 13 of the outermost ply 3 may be located inward from the outer end 14 of the innermost reinforcing layer 6 in the radial direction of the tire as shown in FIG. 11 or outward from the outer end 14 of the innermost reinforcing layer 6 in the radial direction of the tire as shown in FIG. 14. In any case, it is preferable that the extending angle θ1 of the cord 12 in the innermost reinforcing layer 6 with respect to the circumferential direction 15 of the tire is a range of 20–55° and the extending angle θ2 of the cord in the upper portion 10 of the outermost ply 3 with respect to the circumferential direction 15 of the tire is a range of 30–55°. When the extending angle θ1 of the cord 12 in the innermost reinforcing layer 6 with respect to the circumferential direction 15 of the tire is less than 20°, it tends to deteriorate the shearing strain in the circumferential direction at the end portion, while when it exceeds 55°, it tends to deteriorate the shearing strain in the widthwise direction at the end portion. On the other hand, when the extending angle θ2 of the cord in the upper portion 10 of the outermost ply 3 with respect to the circumferential direction 15 of the tire is less than 30°, it tends to deteriorate the shearing strain in the circumferential direction at the end portion, while when it exceeds 55°, it tends to deteriorate the shearing strain in the widthwise direction at the end portion.

Figure 13A:
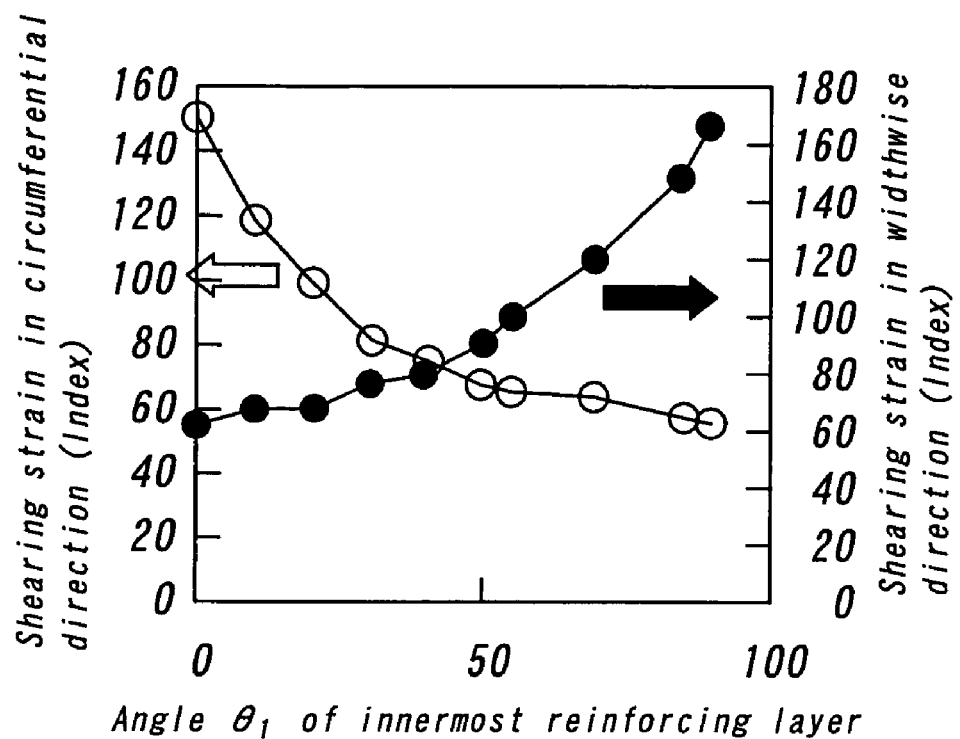
FIG. 13a is a graph when shearing strains in widthwise and circumferential directions at an outer end position 14 of an innermost reinforcing layer 6 in the radial direction of the tire are plotted by changing an extending angle $\theta1$ of the cord 12 in the innermost reinforcing layer 6. with respect to a circumferential direction 15 of the tire.
Figure 13B:
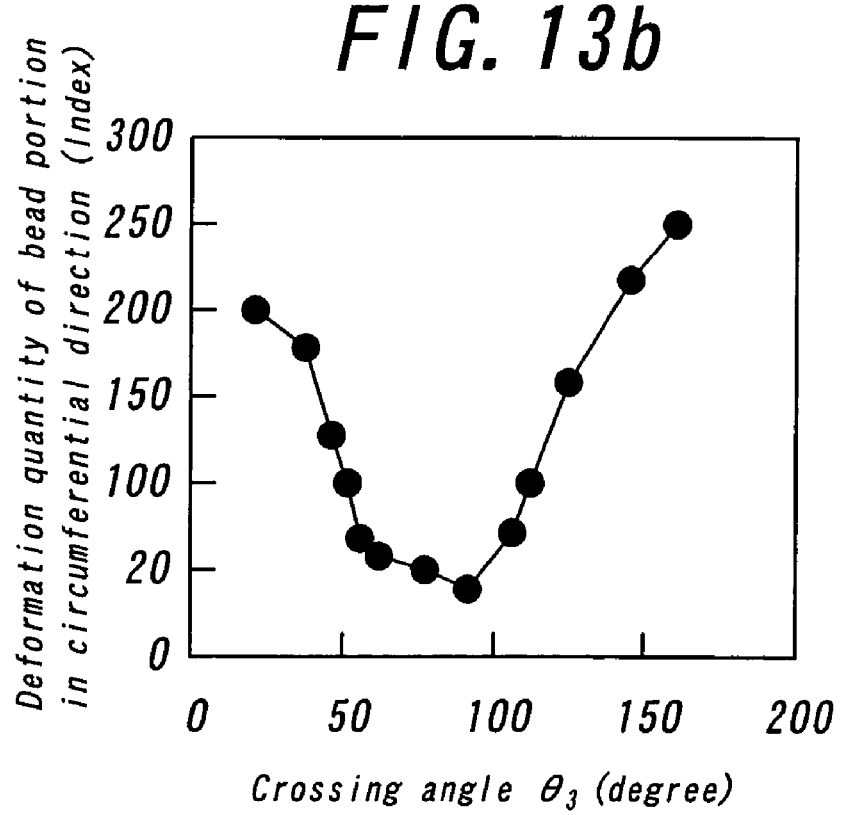
FIG. 13b is a graph when deformation quantity of a bead portion in a circumferential direction is plotted by changing a crossing angle $\theta3$ when the extending angle $\theta1$ is 20°.

FIGS. 13a and 13b show test results in an embodiment that the outer end 13 of the outermost ply 3 is located inward from the outer end 14 of the innermost reinforcing layer 6 in the radial direction of the tire. In FIG. 13a are plotted the shearing strains in the widthwise direction and the circumferential direction at the outer end position 14 of the innermost reinforcing layer 6 in the radial direction of the tire by changing the extending angle θ1 of the cord 12 in the innermost reinforcing layer 6 with respect to the circumferential direction 15 of the tire. In FIG. 13b are plotted the deformation quantity of the bead portion in the circumferential direction by changing the crossing angle θ3 when the extending angle θ1 is 20°. Moreover, the shearing strains in the widthwise direction and the circumferential direction at the outer end position of the innermost reinforcing layer in the radial direction of the tire shown in FIG. 13a are represented by an index value on the basis that a standard tire of the invention is 100 and the deformation quantity of the bead portion in the circumferential direction shown in FIG. 13b is represented by an index value on the basis that conventional tire is 100.

As seen from the results shown in FIGS. 13a and 13b, in the construction of the bead portion shown in FIG. 11, when the extending angle θ1 of the cord 12 of the innermost reinforcing layer 6 with respect to the circumferential direction 15 of the tire is not more than 55°, the shearing strain in the widthwise direction at the outer end position 14 of the innermost reinforcing layer 6 is controlled and when the extending angle θ1 is not less than 20°, the shearing strain in the circumferential direction is controlled. Also, when the crossing angle θ3 is not less than 50°, the deformation in the circumferential direction can effectively be controlled, which is desirable in view of the improvement of the durability.

Figure 15A:
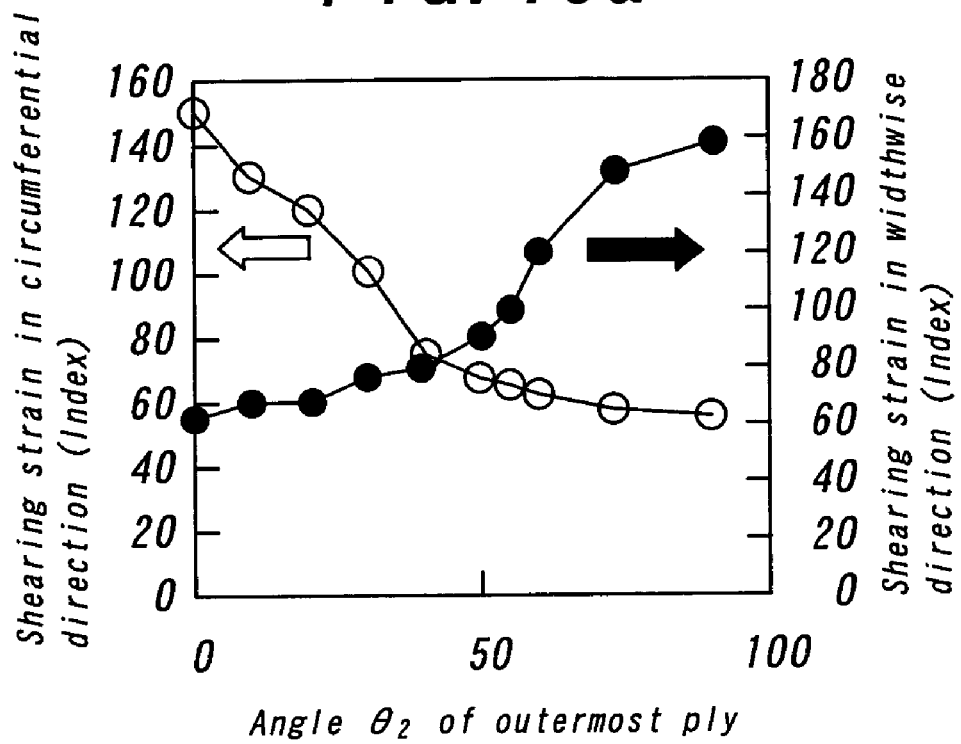
FIG. 15a is a graph when shearing strains in widthwise and circumferential directions at an outer end position 13 of an outermost ply 3 in the radial direction of the tire are plotted by changing an extending angle $\theta2$ of a cord in an upper portion 10 of an outermost ply 3 with respect to a circumferential direction 15 of the tire.
Figure 15B:
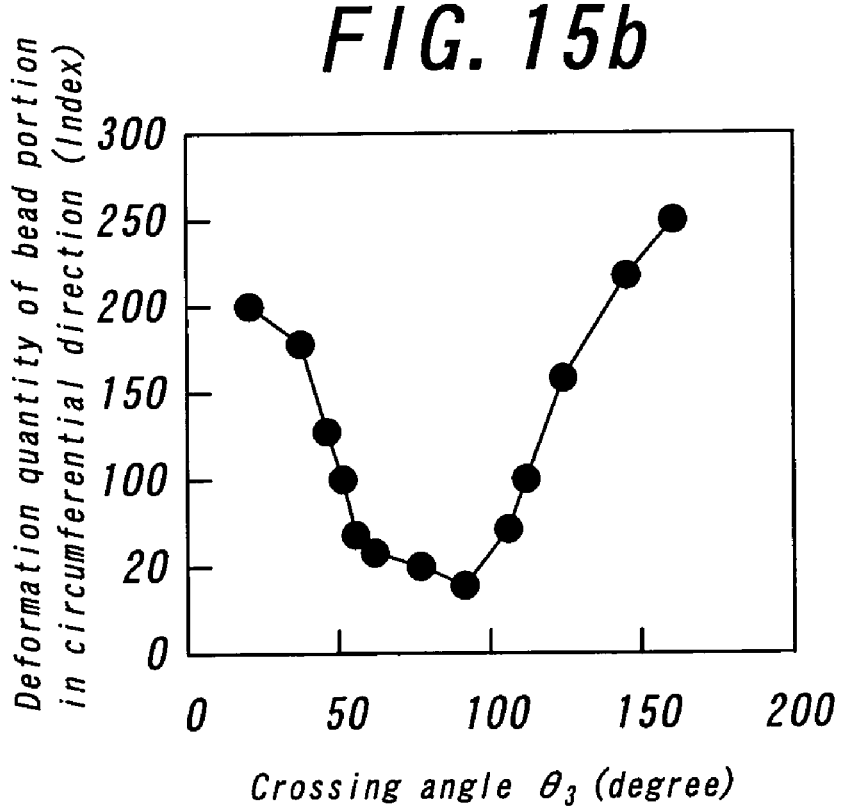
FIG. 15b is a graph when deformation quantity of a bead portion in circumferential direction is plotted by changing a crossing angle $\theta3$ when the extending angle $\theta2$ is 30°.

Furthermore, FIGS. 15a and 15b show test results in an embodiment that the outer end 13 of the outermost ply 3 is located outward from the outer end 14 of the innermost reinforcing layer 6 in the radial direction of the tire. In FIG. 15a are plotted the shearing strains in the widthwise direction and the circumferential direction at the outer end position 13 of the outermost ply 3 in the radial direction of the tire by changing the extending angle θ2 of the cord in the upper portion 10 of the outermost ply 3 with respect to the circumferential direction 15 of the tire. In FIG. 15b are plotted the deformation quantity of the bead portion in the circumferential direction by changing the crossing angle θ3 when the extending angle θ2 is 30°. Moreover, the shearing strains in the widthwise direction and the circumferential direction at the outer end position of the innermost reinforcing layer shown in FIG. 15a is represented by an index value on the basis that a standard tire of the invention is 100 and the deformation ration of the bead portion in the circumferential direction shown in FIG. 15b is represented by an index value on the basis that conventional tire is 100.

As seen from the results shown in FIGS. 15a and 15b, in the construction of the bead portion shown in FIG. 14, when the extending angle θ2 in the upper portion 10 of the outermost ply 3 with respect to the circumferential direction 15 of the tire is not more than 55°, the shearing strain in the widthwise direction at the outer end position 13 of the outermost ply 3 is controlled, while when the extending angle θ2 is not less than 30°, the shearing strain in the circumferential direction is controlled. And also, when the crossing angle θ3 is not less than 50°, the deformation in the circumferential direction can effectively be controlled, which is desirable in view of the improvement of the durability.

In addition, it is preferable that the bending portion 8 is formed by subjecting to a plastic deformation in a direction changing the extending direction of the cord 9 by using, for example, a roll or the like. In this case, it is more preferable to go through a rolling process in order to remove the deformation in a compression loading direction additionally generated.

At a state of a tire-wheel assembly by mounting the tire onto a standard rim and applying a maximum air pressure thereto as shown in FIG. 14, it is preferable to locate the bending portion 8 so that a distance L2 from a height position P of a rim flange Rf to a position of the bending portion 8 as measured in the radial direction of the tire is a range of 0.01–0.5 times a distance L1 to the outer end position 13 of the outermost ply 3. When the distance L2 is less than 0.01 times, it tends to cause a problem that the cords of the carcass ply are broken by the compression stress from the rim flange Rf, while when it exceeds 0.5 times, the effect of sufficiently controlling strain by the cross cord portion 11 is not obtained.

A length d of the cross cord portion 11 in the radial direction of the tire is more preferable to be not less than 20 mm in terms of obtaining the sufficiently deformation controlling effect by the cross cord portion.

Further, it is more preferable in terms of obtaining the sufficiently deformation controlling effect by the cross cord portion 11 that the high-rigidity cords 9 and 12 constituting at least the outermost ply 3 and the innermost reinforcing layer 6 are steel cords or aramid cords and also a modulus of elasticity in all filaments constituting these high-rigidity cords 9 and 12 is not less than 40 GPa.

Moreover, the term "modulus of elasticity in all filaments constituting the high-rigidity cord" used herein means a modulus of elasticity when one filament is tensioned at an untwisted state.

Figure 16:
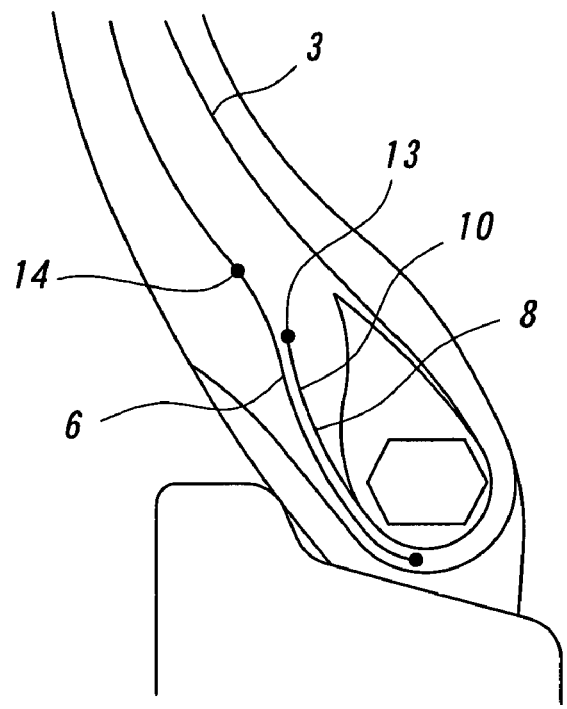
FIG. 16 is a widthwise section view of another embodiment of the bead portion.

In the second aspect of the invention, it is sufficient to form the cross cord portion 11 by at least arranging the reinforcing layer 6 only at the side of the turnup portion 3b of the carcass 5. As shown in FIG. 16, it is particularly preferable to arrange a narrow-width reinforcing layer 6 only at the side of the turnup portion 3b of the carcass 5 in view of the weight reduction.

Figure 17:
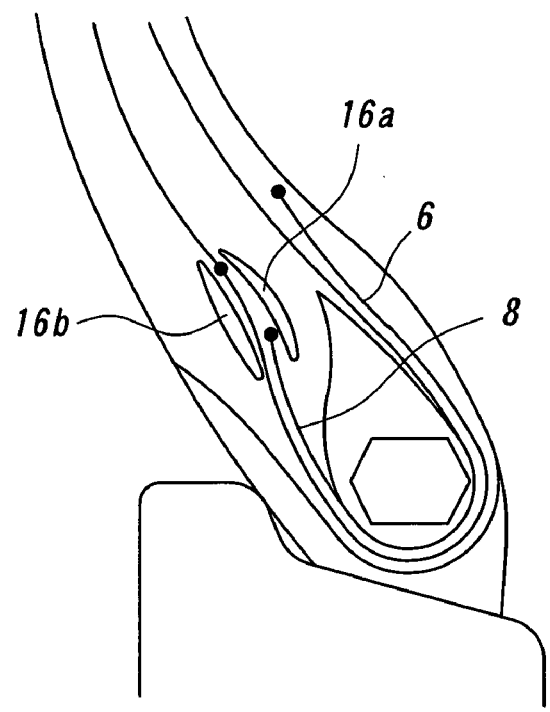
FIG. 17 is a widthwise section view of the other embodiment of the bead portion.
Figure 18:
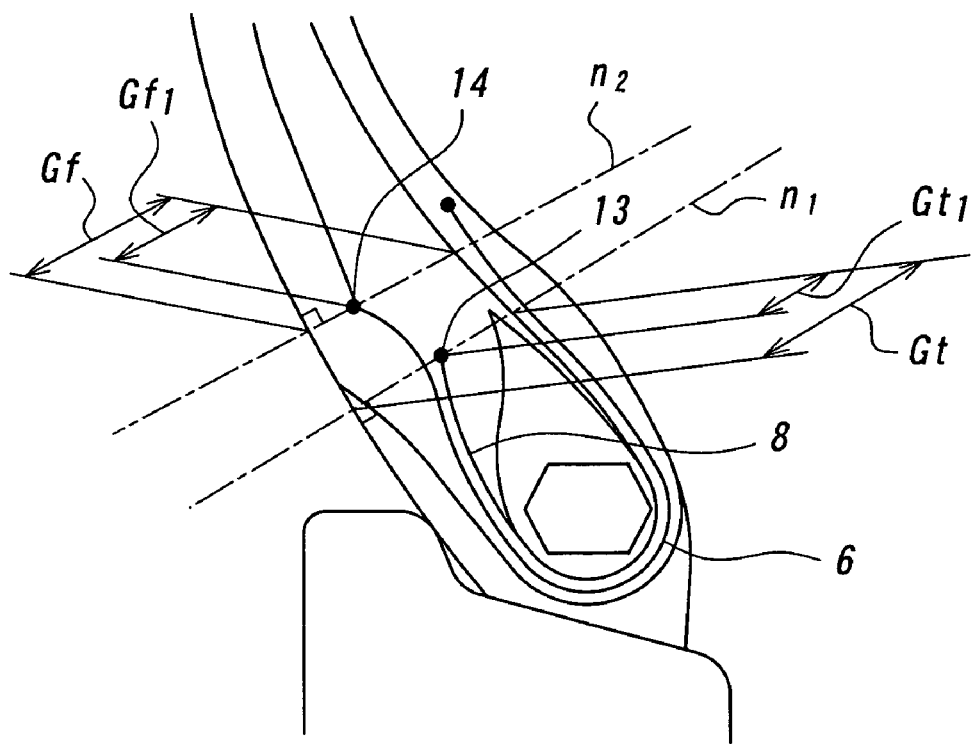
FIG. 18 is a widthwise section view of a further embodiment of the bead portion.

However, in case of attaching importance to the improvement of the durability of the bead portion rather than the weight reduction, as shown in FIGS. 17 and 18, a wide-width reinforcing layer 6 may be arranged over a region ranging from the side of the turnup portion 3b of the carcass 5 to the main body portion 3a thereof, or plural reinforcing layers may be arranged.

Even in the latter case, when the second aspect of the invention is compared with the first aspect of the invention, the same durability of the bead portion can be provided even if the number of the reinforcing layers 6 arranged is decreased by one layer.

If it is required to more further control the strain generated at the outer end 13 of the outermost ply 3 and the outer end 14 of the innermost reinforcing layer 6, a pair of cushion rubber layers 17a, 17b sandwiching both the outer end 13 of the outermost ply 3 and an outer end 14 of the innermost reinforcing layer 6 from both an inside and an outside in the widthwise direction of the tire are arranged over a region including these outer ends 13, 14 in the radial direction of the tire. It is preferable that a rubber hardness in the cushion rubber layers 17a, 17b is a range of 0.95–1.05 of a hardness in rubber constituting the member 3 or 6 having the outer end 13 or 14 located outward in the radial direction of the tire among the members constituting the outermost ply 3 and the innermost reinforcing layer 6, which is capable of controlling the growth of cracks generated at the outer ends 13, 14.

In addition, the cushion rubber layer 17a, 17b is preferable to be made of the same rubber as rubbers constituting the innermost reinforcing layer 6 and the rubber constituting the outermost ply 3 in view of the productivity.

Also, it is preferable to use rubber having a high loss Young's modulus E" in the cushion rubber layer 17a, 17b in view of the improvement of the durability of the bead portion.

Furthermore, if it is required to more further control the strain at each position of the outer ends 13, 14, as shown in FIG. 18, it is preferable that when a normal line passing through a position of an outer end of the cross cord portion in the radial direction of the tire (the outer end position 13 of the turnup portion 3b in FIG. 18) and drawn to an outer surface of the tire is n1 and a normal line passing through a position of an outermost end located more outward in the radial direction of the tire in the outer end position of the outermost ply and the outer end position of the innermost reinforcing layer (the outer end position 14 of the innermost reinforcing layer in FIG. 18) and drawn to an outer surface of the tire is n2 viewing at a cross section in the widthwise direction of the tire, a distance Gt1 from a cord center position of the main body portion 3a of the carcass ply to the outer end position 13 of the cross cord portion 11 in the radial direction of the tire as measured on the normal line n1 is a range of 0.4–0.7 times a distance Gt to the outer surface of the tire in the same manner as mentioned above, and a distance Gf1 from the cord center position of the main body portion 3a of the carcass ply to the outermost end position 14 as measured on the normal line n2 is a range of 0.7–0.9 times a distance Gf to the outer surface of the tire in the same manner as mentioned above.

Since the occurrence of separation failure at the outer end position of the cross cord portion 11 in the radial direction of the tire mainly results from torsion deformation in the circumferential direction 15 of the tire, it is preferable that such an outer end position is arranged in the vicinity of a neutral axis of the torsion deformation, that is, the distance Gt1 is made within a range of 0.4–0.7 times the distance Gt in view of the control of this separation failure. Also, when the rubber portion located inward from the outermost end in the widthwise direction of the tire is made sufficiently thick, i.e. the distance Gf1 is made within a range of 0.7–0.9 times the distance Gf, the compression stress at the outermost end can be mitigated and hence the separation failure at the outermost end can be controlled.

Figure 19:
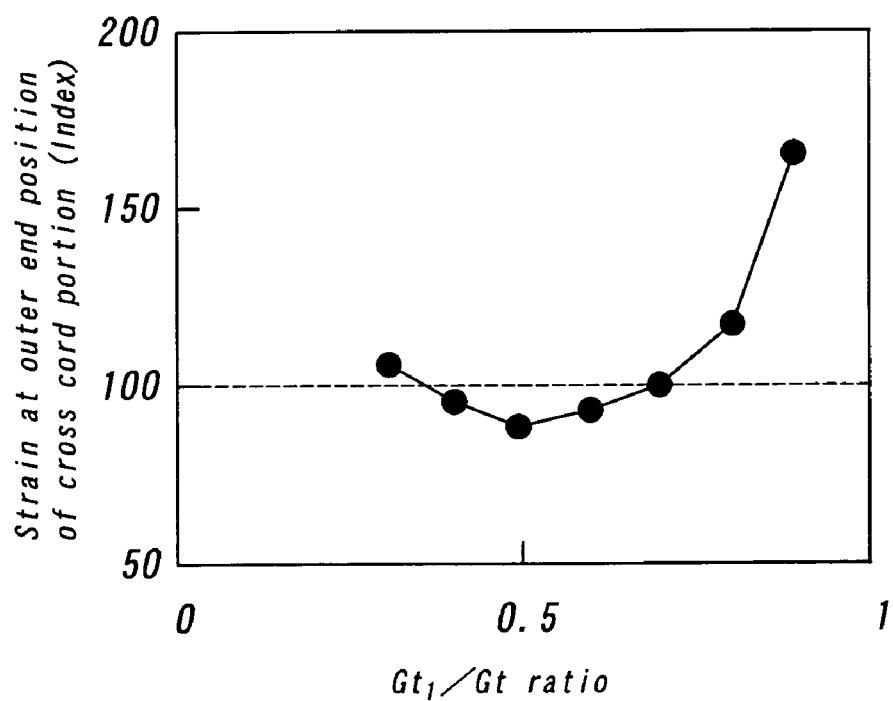
FIG. 19 is a graph when strain at an outer end position of a cross cord portion is plotted with respect to a ratio of Gt1/Gt.
Figure 20:
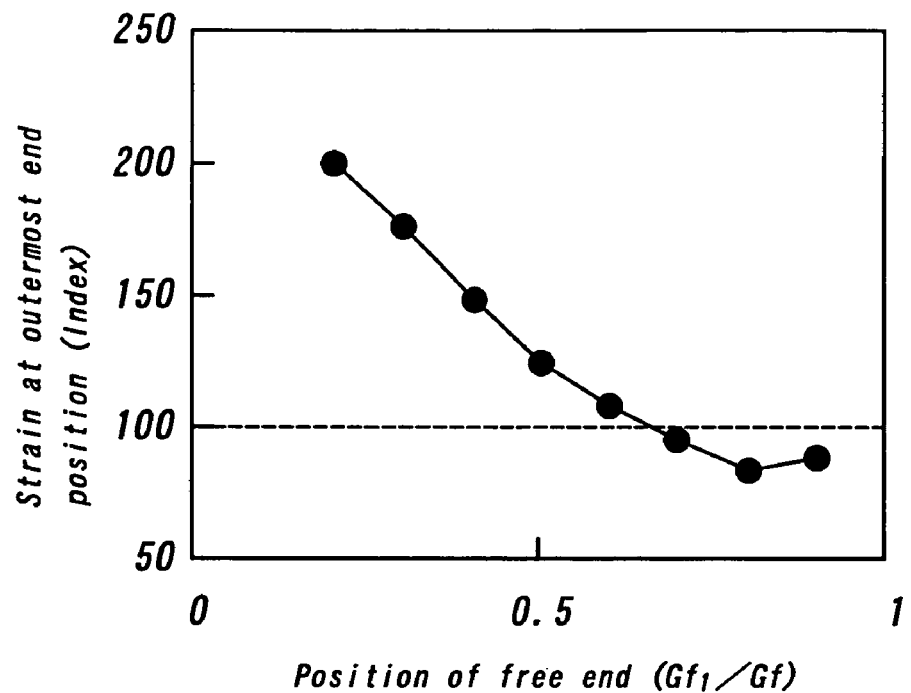
FIG. 20 is a graph when strain at an outermost end position is plotted with respect to a ratio of Gf1 /Gf.
Figure 21:
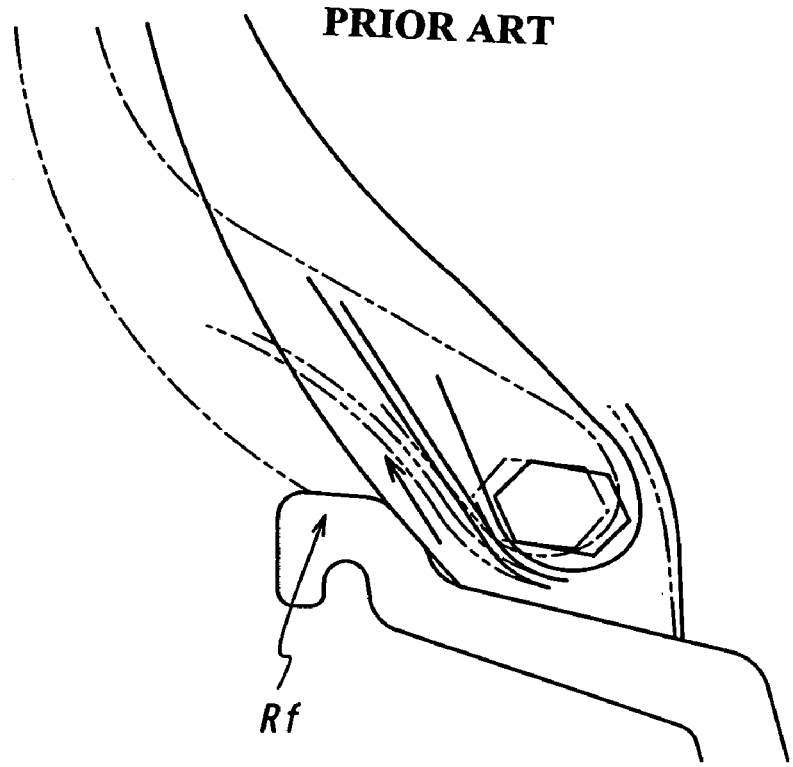
FIG. 21 is a schematic view illustrating a deformation state of a bead portion when a general tire is run under loading.

In FIG. 19 is plotted the strain at the outer end position of the cross cord portion 11 by changing the distance ratio Gt1/Gt. In FIG. 20 is plotted the strain at the outermost end by changing the distance ratio Gf1/Gf.

As seen from the results of FIGS. 19 and 20, the features that the distance Gt1 is the range of 0.4–0.7 times the distance Gt and that the distance Gf1 is the range of 0.7–0.9 times the distance Gf are advantageous in terms of controlling the strain at each of the outer ends 13 and 14.

Although the above is only described with respect to preferred embodiments of the invention, various modifications may be taken within a scope of the invention.

BEST MODE FOR CARRYING OUT THE INVENTION

Test Example 1

The pneumatic tires according to the first aspect of the invention are actually prepared and evaluated with respect to the durability of the tire bead portion as mentioned below.

All test tires are pneumatic radial tires for use in truck and bus having a tire size of 285/60R22.5. All of Comparative Example Tires 1–6 and Example Tires 1–9 have various dimensions shown in Tables 1–4 and the structure other than these dimensions is the same as in the usual pneumatic radial tire for use in truck and bus. In Tables 1–4 are shown dimensions with respect to the reinforcing layers and the like in each test tire.

TABLE 1

Figure 7:
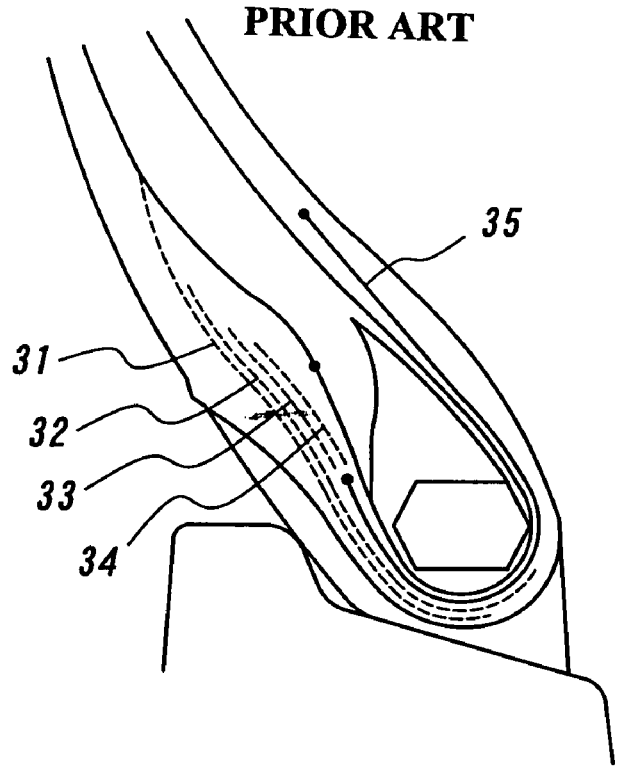
FIG. 7 is a schematic view illustrating an embodiment of the conventional pneumatic radial tire.
Figure 8:
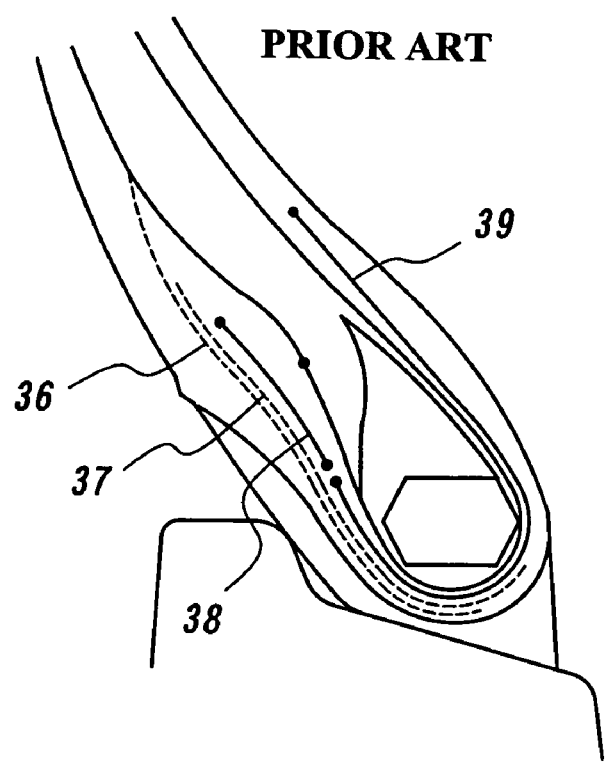
FIG. 8 is a schematic view illustrating another embodiment of the conventional pneumatic radial tire.

|  | Comparative example tire 1 | Comparative example tire 2 | Comparative example tire 3 | Comparative example tire 4 |
|---|---|---|---|---|
| Reference drawing | FIG. 7 | FIG. 7 | FIG. 8 | FIG. 1 |
| Reinforcing layer, etc. (1) | (L/0.3/0.0063/L45/31) | (L/0.3/0.0063/L45/31) | (L/0.3/0.0063/L45/36) | (H/210/0.76/L45/6a) |
| Reinforcing layer, etc. (2) | (L/0.3/0.0063/R45/32) | (L/0.3/0.0063/R45/32) | (L/0.3/0.0063/R45/37) | (H/210/0.76/R45/6b) |
| Reinforcing layer, etc. (3) | (L/0.3/0.0063/L45/33) | (H/210/0.109/R30/35) | (H/210/0.44/L30/38) | (H/210/0.0109/R30/6c) |
| Reinforcing layer, etc. (4) | (L/0.3/0.0063/R45/34) | — | (H/210/0.109/R30/39) | — |
| Reinforcing layer, etc. (5) | (H/210/0.109/R30/35) | — | — | — |

TABLE 2

|  | Comparative example tire 5 | Comparative example tire 6 | Example tire 1 | Example tire 2 |
|---|---|---|---|---|
| Reference drawing | FIG. 1 | FIG. 1 | FIG. 1 | FIG. 1 |
| Reinforcing layer, etc. (1) | (H/210/0.0096/L45/6a) | (H/210/1.12/L45/6a) | (H/210/0.15/L45/6a) | (H/210/0.61/L45/6a) |
| Reinforcing layer, etc. (2) | (H/210/0.0096/R45/6b) | (H/210/1.12/R45/6b) | (H/210/0.15/R45/6b) | (H/210/0.61/R45/6b) |
| Reinforcing layer, etc. (3) | (H/210/0.0109/R30/6c) | (H/210/0.0109/R30/6c) | (H/210/0.109/R30/6c) | (H/210/0.109/R30/6c) |
| Reinforcing layer, etc. (4) | — | — | — | — |
| Reinforcing layer, etc. (5) | — | — | — | — |

TABLE 3

|  | Example tire 3 | Example tire 4 | Example tire 5 | Example tire 6 |
|---|---|---|---|---|
| Reference drawing | FIG. 1 | FIG. 1 | FIG. 1 | FIG. 3 |
| Reinforcing layer, etc. (1) | (H/210/0.014/L45/6a) | (H/210/0.15/L60/6a) | (H/210/0.15/L30/6a) | (H/210/0.15/L45/6a) |
| Reinforcing layer, etc. (2) | (H/210/0.014/R45/6b) | (H/210/0.15/R60/6b) | (H/210/0.15/R30/6b) | (H/210/0.15/R45/6b) |
| Reinforcing layer, etc. (3) | (H/210/0.109/R30/6c) | (H/210/0.109/R30/6c) | (H/210/0.109/R30/6c) | (H/210/0.109/R30/6c) |
| Reinforcing layer, etc. (4) | — | — | — | — |
| Reinforcing layer, etc. (5) | — | — | — | — |

TABLE 4

|  | Example tire 7 | Example tire 8 | Example tire 9 |
|---|---|---|---|
| Reference drawing | FIG. 4 | FIG. 5 | FIG. 6 |
| Reinforcing layer, etc. (1) | (H/210/0.15/L45/6a) | (H/210/0.15/L45/6a) | (H/210/0.15/L45/6a) |
| Reinforcing | (H/210/0.15/ | (H/210/0.15/ | (H/210/0.15/ |

TABLE 4-continued

| | Example tire 7 | Example tire 8 | Example tire 9 |
|---|---|---|---|
| layer, etc. (2) | R45/24) | R45/24) | R45/6b) |
| Reinforcing layer, etc. (3) | — | — | (H/210/0.109/ R30/6c) |
| Reinforcing layer, etc. (4) | — | — | (L/0.3/0.01/ L45/27) |
| Reinforcing layer, etc. (5) | — | — | — |

Moreover, the dimension of each reinforcing layer in Tables 1–4 represents (whether or not the cord of the reinforcing layer is a high-rigidity cord/modulus of elasticity of each filament constituting the cord (GPa)/product (GPa·mm⁴cords/mm) of bending rigidity (GPa·mm⁴) per one cord and end count (cords/mm)/extending angle (°) of the cord with respect to circumferential direction of tire/numeral in reference drawing).

In Tables 1–4, the term "reinforcing layer, etc." means the inclusion of a protection layer if the protection layer 27 is arranged, and the reinforcing layer is represented as "H" in case of a high-rigidity cord and as "L" in case of a low-rigidity cord, and the extending angle (°) of the cord with respect to the circumferential direction of the tire viewing from a side of the tire at a state of mounting onto a vehicle is represented as "R" when it is upward to the right with respect to an equatorial plane of the tire and as "L" when it is upward to the left, and a numerical value denoted next to "R" or "L" means an angle with respect to the equatorial plane of the tire.

And also, the bending rigidity (GPa·mm⁴) per one cord is represented by the following formula:

Formula:

$$D = 2N \cos \beta / \{[(1+\cos^2\beta)/EI] + [\sin^2\beta/GI_p]\},$$

$$G = E/[2(1+\mu_f)]$$

In this case, N is the number of filaments per each reinforcing layer, β is a twisting angle of the filament, E is a Young's modulus, G is a modulus of transverse elasticity, and I is a moment of inertia of area ($I=(\pi/64)\times d^4$, $I_p=(\pi/32)\times d^4$, "d" is a diameter of the filament), and $\mu_f$ is a Poisson's ratio of the filament.

The evaluation with respect to the durability of the tire bead portion is carried out by running the tire on a drum testing machine of 1.7 m in radius at a speed of 60 km/h until the bead portion is broken while applying a load of 47.3 kN corresponding to 1.5 times a maximum load capacity of 31.5 kN under conditions of a maximum air pressure: 900 kPa and an approved rim: 9.00×22.5.

The results on the durability of the tire bead portion are shown in Table 5. In this case, the numerical value evaluated with respect to the durability is represented by an index on the basis that Comparative Example Tire 1 is control (100), in which the larger the numerical value, the more excellent the durability of the tire bead portion.

TABLE 5

| | Bead portion durability |
|---|---|
| Comparative example tire 1 | 100 |
| Comparative example tire 2 | 60 |
| Comparative example tire 3 | 90 |
| Comparative example tire 4 | 85 |
| Comparative example tire 5 | 80 |

TABLE 5-continued

| | Bead portion durability |
|---|---|
| Comparative example tire 6 | 20 |
| Example tire 1 | 145 |
| Example tire 2 | 120 |
| Example tire 3 | 115 |
| Example tire 4 | 115 |
| Example tire 5 | 118 |
| Example tire 6 | 160 |
| Example tire 7 | 135 |
| Example tire 8 | 145 |
| Example tire 9 | 165 |

As seen from Table 5, the durability of the tire bead portion in all of Example Tires 1–9 is more excellent than those of Comparative Example Tires 1–6.

Test Example 2

The durability of the tire bead portion is investigated by changing a crossing angle α (°) between cords of adjacent reinforcing layers with respect to the circumferential direction of the tire in the pneumatic tire according to the first aspect of the invention having the construction of the bead portion shown in FIG. 1. The investigation results are shown in FIG. 9.

Figure 9:
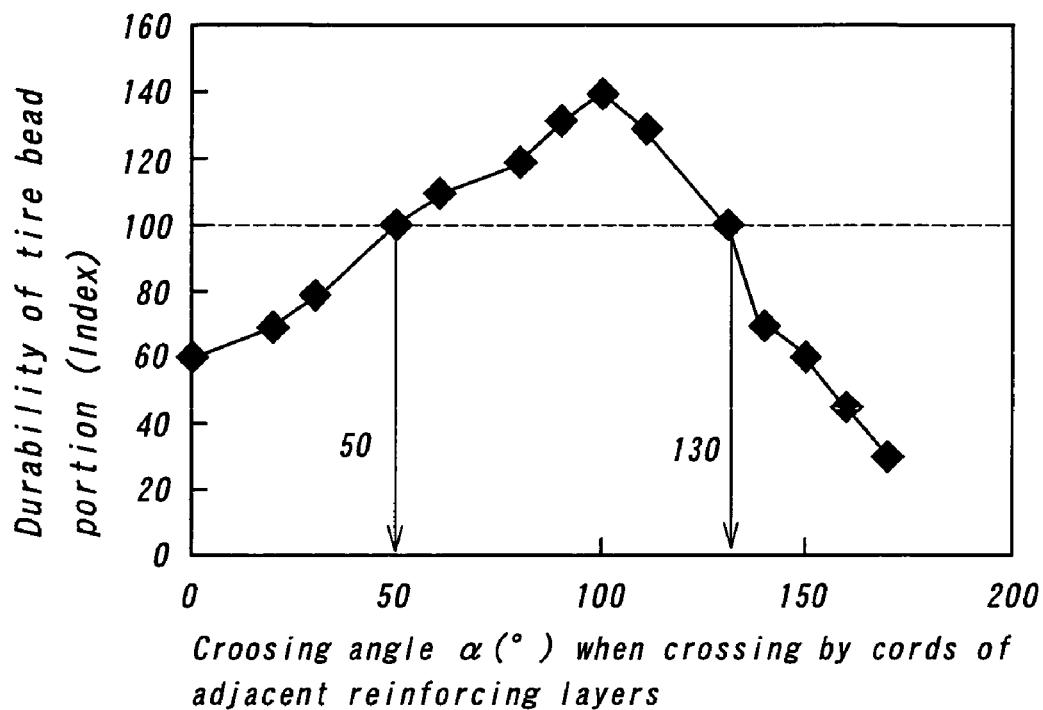
FIG. 9 is a graph showing a relationship between the durability of the tire bead portion and the crossing angle α (°)between the cords of the adjoining reinforcing layers.

As seen from the results of FIG. 9, the excellent durability is developed when the crossing angle a is a range of 50 <θ<130 (°).

Moreover, the durability of the tire bead portion shown in FIG. 9 is evaluated by an index on the basis that a tire having the crossing angle α(°) of 50° is control (100).

Test Example 3

The durability of the tire bead portion is investigated by changing the product (GPa·mm⁴cords/mm) of bending rigidity per one cord (GPa·mm⁴) and end count (cords/mm) in the pneumatic tire having the construction of the bead portion shown in FIG. 1. The investigation results are shown in FIG. 10.

Figure 10:
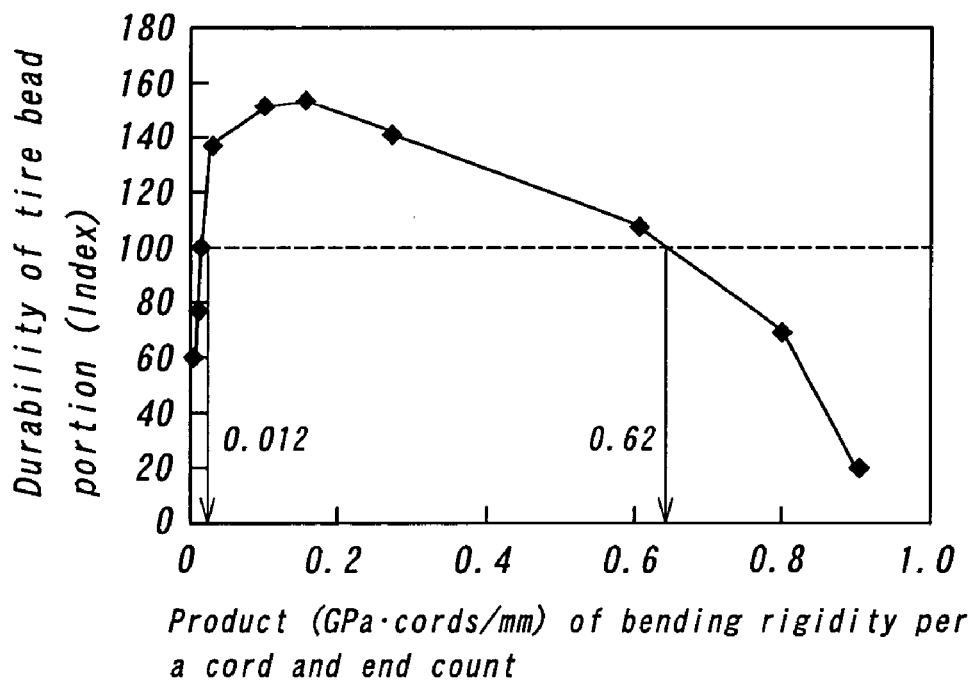
FIG. 10 is a graph showing a relationship between the durability of the tire bead portion and the product (GPa·mm$^4$·cords/mm) of bending rigidity per one cord (GPa·mm$^4$) and end count (cords/mm)

As seen from the results of FIG. 10, the excellent durability is developed when the product of bending rigidity per one cord (GPa·mm⁴) and end count (cords/mm) is a range of 0.012–0.62 (GPa·mm⁴cords/mm).

Moreover, the durability of the tire bead portion shown in FIG. 10 is evaluated by an index on the basis that a tire having the product (GPa·mm⁴cords/mm) of bending rigidity per one cord (GPa·mm⁴) and end count (cords/mm) of 0.012 is control (100).

Test Example 4

The pneumatic tires according to the second aspect of the invention are prepared and are evaluated with respect to performances as mentioned below.

EXAMPLE 1

The tire of Example 1 is a pneumatic radial tire for use in truck and bus having the construction of the bead portion shown in FIG. 11 and a tire size of 285/60R22.5, in which a wide-width reinforcing layer (wire-reinforced layer) is arranged over a region ranging from the turnup portion of the carcass to the main body portion thereof, and a crossing angle of the cords constituting the cross cord portion is 90°, and an extending angle of the cord in the innermost reinforcing layer with respect to the circumferential direction of the tire is 45°, and an extending angle of the cord in the upper portion of the outermost ply with respect to the circumferential direction of the tire is 45°, and a bending portion is located in a position corresponding to 0.15 times a distance from a height position of a rim flange to an outer end position of the outermost ply as measured in the radial direction of the tire, and a length of the cross cord portion in the radial direction of the tire is 24 mm, and high-rigidity cords constituting each of the outermost ply and the innermost reinforcing layer are steel cords, and a modulus of elasticity of all filaments constituting the high-rigidity cord is 3100 GPa, and a distance ratio Gt1/Gt is 0.64, and a distance ratio Gf1/Gf is 0.83.

Moreover, the other structure of the tire is the same as in the usual pneumatic radial tire for use in truck and bus.

EXAMPLE 2

The tire of Example 2 is a tire having the construction of the bead portion shown in FIG. 16 and the same structure as in the tire of Example 1 except that a narrow-width reinforcing layer (wire-reinforced layer) is arranged only at the turnup portion of the carcass.

Comparative Example

Figure 23:
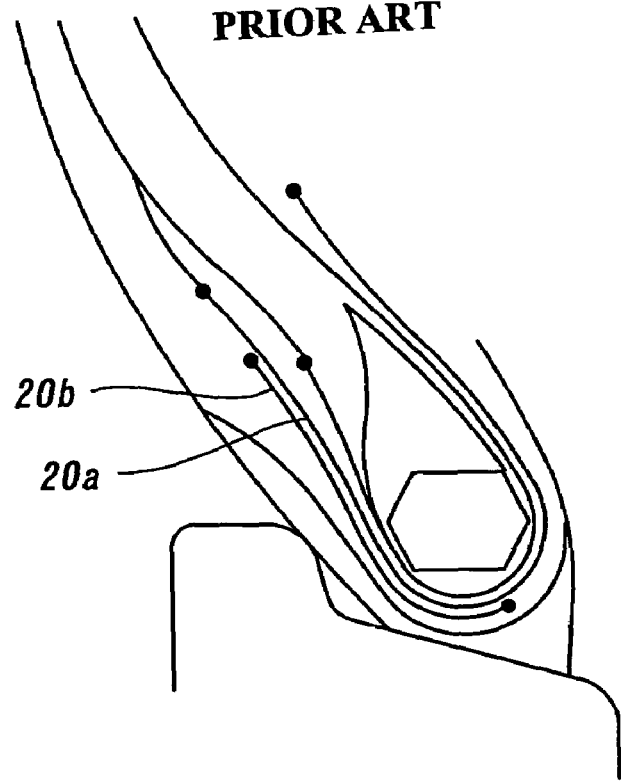
FIG. 23 is a widthwise section view of a bead portion in a tire of a comparative example.

The tire of Comparative Example is a tire having the construction of the bead portion shown in FIG. 23 and the same structure as in the tire of Example 1 except that the bending portion is not formed in the turnup portion and two wire-reinforced layers 20a, 20b are arranged so as to render a crossing angle of cords into 90° and cover the outer end of the turnup portion, and a cushion rubber is arranged between an outside of the outer end of the turnup portion of the carcass in the widthwise direction of the tire and an inner surface of the wire-reinforced layer for controlling the strain at the position of the outer end.

Conventional Example

Figure 22:
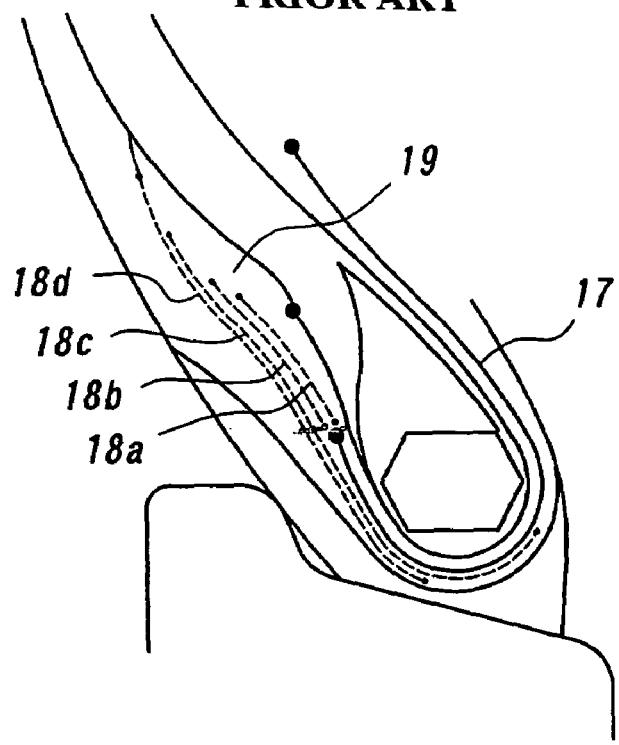
FIG. 22 is a widthwise section view of a bead portion in a tire of a conventional example.

The tire of Conventional Example is a tire having the construction of the bead portion shown in FIG. 22 and the same structure as in the tire of Example 1 except that a bending portion is not formed in the turnup portion, and a wire-reinforced layer 17 and four nylon-reinforced layers 18a–18d are arranged, and a cushion rubber 19 is arranged between an outside of the outer end of the turnup portion of the carcass in the widthwise direction of the tire and an inner surface of the wire-reinforced layer for controlling the strain at the position of the outer end.

The evaluation for the durability of the bead portion is carried out by assembling each of the test tires onto a standard rim (9.00×22.5) and running on a drum testing machine of 1.7 m in radius at a speed of 60 km/h under a maximum air pressure (900 kPa) and a load corresponding to 1.5 times a maximum load capacity (30.87 kN) to measure a running distance until the bead portion is broken. The evaluation results are shown in Table 6. Moreover, the numerical value of the durability in Table 6 is represented by an index on the basis that Conventional example is 100, in which the larger the numerical value, the more excellent the durability of the bead portion. And also, the tire weight is measured to obtain the results shown in Table 6.

TABLE 6

| | Bead portion durability | Tire weight (kgf) |
|---|---|---|
| Conventional example | 100 | 49.8 |
| Comparative example | 150 | 52.3 |
| Example 1 | 150 | 49.2 |
| Example 2 | 168 | 48.7 |

As seen from the results of Table 6, all of Examples 1 and 2 are excellent in the durability of the bead portion as compared with the conventional example and also are equal to or more than the comparative example in the durability of the bead portion and attain the reduction of the tire weight.

INDUSTRIAL APPLICABILITY

According to the first and second aspects of the invention, it is possible to provide pneumatic tires having an excellent durability of the bead portion.

Particularly, according to the second aspect of the invention, there can be provided pneumatic tires having an improved durability by utilizing the outermost ply located at the turnup portion of the carcass while controlling the increase of the weight accompanied with the arrangement of the reinforcing layers.

The invention claimed is:

1. A pneumatic tire, comprising
   a radial carcass of at least one carcass ply comprised of a main body portion toroidally extending between bead cores respectively embedded in a pair of bead portions, and a turnup portion extending from the body portion and wound around the bead core and a bead filler located just above the bead core,
   said bead filler being comprised of a lower rubber portion arranged adjacent to an outer circumferential surface of the bead core and an upper rubber portion arranged adjacent to the lower rubber portion and outward therefrom in a radial direction of the tire and having a rigidity lower than that of the lower rubber portion,
   wherein the tire comprises a reinforcing member consisting of at least two rubberized reinforcing layers each containing steel cords or organic fiber cords arranged in parallel to each other, and
   at least two reinforcing layers among these reinforcing layers constituting the reinforcing member are cross reinforcing layers arranged so as to envelop at least the turnup portion of the radial carcass and cross the cords of these layers with each other, and
   both outer ends of the reinforcing layers constituting the cross reinforcing layers located outward from the turnup portion of the radial carcass in a width-wise direction of the tire are located outward from an outer end of the turnup portion of the radial carcass in the radial direction of the tire, and
   the steel cord or the organic fiber cord constituting each of the reinforcing layers is formed by twisting filaments each having a modulus of elasticity of not less than 40 GPa, and
   a bending rigidity per one steel cord or one organic fiber cord is not more than 2 GPa·mm 4, and the product of the bending rigidity (GPa·mm 4) per one cord and an end count (cords/mm) in the steel cords or the organic fiber cords is 0.012–0.62 (GPa.mm 4.cords/mm), and a crossing angle (α) between the cords of the adjacent reinforcing layers with respect to a circumferential direction of the tire is more than 50° but less than 130°,
wherein the bending rigidity per one cord is represented by the following formula:

$$D = 2N \cos\beta / \{[(1+\cos^2\beta)/EI] + [\sin^2\beta/GI_p]\},$$

$$G = E/[2(1+\mu_f)]$$

where N is the number of filaments per each reinforcing layer,
β is a twisting angle of the filament,
E is a Young's modulus,
G is a modulus of transverse elasticity,
I is a moment of inertia of area ($I=(\pi/64)\times d^4$, $I_p=(\pi/32)\times d^4$, "d" is a diameter of the filament), and
$\mu_f$ is a Poisson's ratio of the filament.

2. A pneumatic tire according to claim 1, wherein one reinforcing layer among the reinforcing layers constituting the reinforcing member is a wide reinforcing layer arranged so as to envelop a zone of the radial carcass ranging from the turnup portion to the main body portion and an inner end of the wide reinforcing layer, located inward from the main body portion of the radial carcass in the widthwise direction of the tire, is located outward from an outermost end of the lower rubber portion constituting the bead filler in the radial direction of the tire.

3. A pneumatic tire according to claim 2, wherein the wide reinforcing layer is constituted with two or more split reinforcing layer sections separated along the circumferential direction of the tire.

4. A pneumatic tire according to claim 1, wherein a protection layer of rubberized cords each formed by twisting filaments each having a modulus of elasticity of less than 40 GPa is arranged between the reinforcing member and the carcass and/or so as to at least envelop the outer ends of the cross reinforcing layers located outside the turnup portion of the radial carcass in the widthwise direction of the tire.

5. A pneumatic tire according to claim 1, wherein a cushion rubber layer is arranged outside the turnup portion of the radial carcass in the widthwise direction of the tire.

6. A pneumatic tire according to claim 1, wherein the reinforcing layers are arranged only at the side of the turnup portion of the carcass.

* * * * *